(12) United States Patent
Fullerton et al.

(10) Patent No.: US 6,778,603 B1
(45) Date of Patent: Aug. 17, 2004

(54) METHOD AND APPARATUS FOR GENERATING A PULSE TRAIN WITH SPECIFIABLE SPECTRAL RESPONSE CHARACTERISTICS

(75) Inventors: Larry W. Fullerton, Brownsboro, AL (US); Mark D. Roberts, Huntsville, AL (US); James L. Richards, Fayetteville, TN (US); Marcus H. Pendergrass, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 743 days.

(21) Appl. No.: 09/708,025

(22) Filed: Nov. 8, 2000

(51) Int. Cl.[7] .................................................. H03K 7/08
(52) U.S. Cl. ........................................................ 375/238
(58) Field of Search ................................ 375/238, 239, 375/295, 302, 242; 342/204, 202, 132, 375, 450

(56) References Cited

U.S. PATENT DOCUMENTS

| | | |
|---|---|---|
| 3,518,555 A | 6/1970 | Konotchick |
| 3,588,707 A | 6/1971 | Manship |
| 4,621,365 A | 11/1986 | Chiu |
| 4,641,317 A | 2/1987 | Fullerton |
| 4,675,880 A | 6/1987 | Davarian |
| 4,813,057 A | 3/1989 | Fullerton |
| 4,901,307 A | 2/1990 | Gilhousen et al. |
| 4,979,186 A | 12/1990 | Fullerton |
| 5,363,108 A | 11/1994 | Fullerton |
| 5,559,519 A | 9/1996 | Fenner |
| 5,610,907 A | 3/1997 | Barrett |
| 5,677,927 A | 10/1997 | Fullerton |
| 5,687,169 A | 11/1997 | Fullerton |
| 5,764,696 A | 6/1998 | Barnes et al. |
| 5,809,063 A | 9/1998 | Ashe et al. |
| 5,832,035 A | 11/1998 | Fullerton |
| 5,847,677 A | 12/1998 | McCorkle |
| 6,111,536 A | 8/2000 | Richards et al. |
| 6,133,876 A | 10/2000 | Fullerton et al. |
| 6,212,230 B1 * | 4/2001 | Rybicki et al. ............. 375/239 |
| 6,614,384 B2 * | 9/2003 | Hall et al. .................... 342/28 |

FOREIGN PATENT DOCUMENTS

| | | |
|---|---|---|
| WO | WO 9723071 | 6/1997 |

* cited by examiner

*Primary Examiner*—Khai Tran
(74) *Attorney, Agent, or Firm*—Venable; Robert S. Babayi

(57) ABSTRACT

A system and method for shaping the energy spectrum of a pulse train used by a pulse transmission system. The initial temporal and non-temporal characteristics of pulses comprising the pulse train are established using a designed code or a pseudorandom code and the spectral properties of the pulse train are determined. At least one characteristic of at least one pulse of the plurality of pulses that make up the pulse train are modified or at least one pulse is added or deleted to the pulse train and the spectral properties of the modified pulse train are determined. Whether or not the modification to the pulse train improved the energy spectrum relative to acceptance criteria is determined. The pulse train having the most desirable energy spectrum is selected. The optimization process can also iterate and may employ a variety of search algorithms.

39 Claims, 22 Drawing Sheets

METHOD AND APPARATUS FOR GENERATING A PULSE TRAIN WITH SPECIFIABLE SPECTRAL RESPONSE CHARACTERISTICS

TECHNICAL FIELD

The present invention relates to impulse transmission systems and, more particularly, to a method and apparatus for generating a pulse train having specifiable spectral response characteristics for use by an impulse transmission system.

BACKGROUND OF THE INVENTION

As the availability of communication bandwidth in the increasingly crowded frequency spectrum is becoming a scarce and valuable commodity, Time Modulated Ultra Wideband (TM-UWB) technology provides an excellent alternative for offering significant communication bandwidth, particularly, for various wireless communications applications. Because TM-UWB communication systems are based on communicating extremely short-duration pulses (e.g., pico-seconds in duration), such systems are also known as impulse radio systems. Impulse radio systems were first described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,057 (issued Nov. 8, 1994) to Larry W. Fullerton, and U.S. Pat. No. 5,677,927 (issued Oct. 14, 1997), U.S. Pat. No. 5,687,169 (issued Nov. 11, 1997), and U.S. Pat. No. 5,832,035 (issued Nov. 3, 1998) to Larry W. Fullerton, et al. These patents are incorporated herein by reference.

Multiple access impulse radio systems are radically different from conventional Code Division Multiple Access (CDMA), Time Division Multiple Access (TDMA) and Frequency Division Multiple Access (FDMA) systems. Unlike such systems, which use continuous sinusoidal waveforms for transmitting information, a conventional impulse radio transmitter emits a low power electromagnetic train of short pulses, which are shaped to approach a Gaussian monocycle. As a result, the impulse radio transmitter uses very little power to generate noise-like communication signals for use in multiple-access communications, radar and positioning applications, among other things. In the multi-access communication applications, the impulse radio systems depend, in part, on processing gain to achieve rejection of unwanted signals. Because of the extremely high achievable processing gains, the impulse radio systems are relatively immune to unwanted signals and interference, which limit the performance of systems that use continuous sinusoidal waveforms. The high processing gains of the impulse radio systems also provide much higher dynamic ranges than those commonly achieved by the processing gains of other known spread-spectrum systems.

Impulse radio communication systems transmit and receive the pulses at precisely controlled time intervals, in accordance with a time-hopping code. As such, the time-hopping code defines a communication channel that can be considered as a unidirectional data path for communicating information at high speed. In order to communicate the information over such channels, typical impulse radio transmitters use position modulation, which is a form of time modulation, to position the pulses in time, based on instantaneous samples of a modulating information signal. The modulating information signal may for example be a multi-state information signal, such as a binary signal. Under this arrangement, a modulator varies relative positions of a plurality of pulses on a pulse-by-pulse basis, in accordance with the modulating information signal and a specific time-hopping code that defines the communication channel.

In applications where the modulating information signal is a binary information signal, each binary state may modulate the time position of more than one pulse to generate a modulated, coded timing signal that comprises a train of identically shaped pulses that represent a single data bit. The impulse transmitter applies the generated pulses to a specified transmission medium, via a coupler, such as an antenna, which electromagnetically radiates the pulses for reception by an impulse radio receiver. The impulse radio receiver typically includes a single direct conversion stage. Using a correlator, the conversion stage coherently converts the received pulses to a baseband signal, based on a priori knowledge of the time-hopping code. Because of the correlation properties of the selected time-hopping codes, the correlator integrates the desired received pulses coherently, while the undesired noise signals are integrated non-coherently such that by comparing the coherent and on-coherent integration results, the impulse receiver can recover the communicated information.

Conventional spread-spectrum code division multiple access (SS-CDMA) techniques accommodate multiple users by permitting them to use the same frequency bandwidth at the same time. Direct sequence CDMA systems employ pseudo-noise (PN) codewords generated at a transmitter to "spread" the bandwidth occupied by transmitted data beyond the minimum required by the data. The conventional SS-CDMA systems employ a family of orthogonal or quasi-orthogonal spreading codes, with a pilot spreading code sequence synchronized to the family of codes. Each user is assigned one of the spreading codes as a spreading function. One such spread-spectrum system is described in U.S. Pat. No. 4,901,307 entitled "SPREAD-SPECTRUM MULTIPLE ACCESS COMMUNICATION SYSTEM USING SATELLITE OR TERRESTRIAL REPEATERS" by Gilhousen et al.

Unlike direct sequence spread-spectrum systems, impulse radio communications systems have not employed time-hopping codes for energy spreading, because the monocycle pulses themselves have an inherently wide bandwidth. Instead, the impulse radio systems use the time-hoping codes for channelization, energy smoothing in the frequency domain, and interference suppression. The time-hoping code defines a relative position of each pulse within a group of pulses, or pulse train, such that the combination of pulse positions defines the communications channel. In order to convey information on such communication channel, each state of a multi-state information signal varies a relative pulse position by a predefined time shift such that a modulated, coded timing signal is generated comprising a train of pulses, each with timing corresponding to the combination of the time position coding and the multi-state modulation.

In one conventional binary modulation approach, pulses are time-modulated forward or backward about a nominal position. More specifically, each pulse is time modulated by adjusting its position within a time frame to one of two or more possible times. For example, in order to send a "0" binary bit during the time frame, the pulse may be offset from a nominal position of the time frame by about −50 picoseconds. For a "1" binary state, the pulse may be offset from the nominal position by about +50 picoseconds. Conventional coders that generate the time-hoping code do so in response to a periodic timing signal that corresponds to the data-rate of the multi-state information signal. The data rate of the impulse radio transmission may for example be a fraction of a periodic timing signal that is used as a time base or time reference.

In practice, decoding errors are minimized using distinctive time-hopping codes with suitable autocorrelation and cross-correlation properties. The cross-correlation between any two time-hopping codes should be low for minimal interference between multiple users in a communications system or between multiple target reflections in radar and positioning applications. At the same time, the autocorrelation property of a time-hoping code should be steeply peaked, with small side-lobes. Maximally peaked time-hopping code autocorrelation yields optimal acquisition and synchronization properties for communications, radar and positioning applications.

Various coding schemes with known correlation characteristics are available. For example, algebraic codes, Quadratic Congruential (QC) codes, Hyperbolic Congruential (HC) codes and optical codes have been suggested in the past for coding in impulse radio systems. Generally, based on known assumptions, the coding schemes guarantee a maximum number of pulse coincidences, i.e., hits, for any defined time frame or time frame shift during which the codes are repeated. For example, HC codes are guaranteed a maximum of two hits for any subframe or frame shift.

McCorkle in U.S. Pat. No. 5,847,677 discloses a random number generator for generating a pseudorandom code for use with jittered pulse repetition interval radar systems. The code is generated by a random number generator that possesses certain attributes deemed desirable for a jittered radar. As disclosed, the claimed attributes related to a flat frequency spectrum, a nearly perfect spike for an autocorrelation function, a controllable absolute minimum and maximum interval, long sequences that do not repeat, and a reasonable average pulse rate.

One known coding technique for an impulse radio is disclosed by Barrett in U.S. Pat. No. 5,610,907, entitled "Ultrafast Time Hopping CDMA-RF Communications: Code-As-Carrier, Multichannel Operation, High data Rate Operation and Data Rate on Demand." According to the disclosed techniques, two levels of coding are used: major orthogonal codes are applied to provide multiple channels, and forward error correction (FEC) codes are applied to information data before transmission. The disclosed system relies on dividing time into repetitive super-frames, frames and subframes. As disclosed, a super-frame corresponds to a time interval of about 1 millisecond, representing one repetition of a code pattern, where as a frame is defined as a time interval of about 1 microsecond divided according to a code length. A subframe corresponds to a short time interval of about 1 nanosecond during which a pulse is time positioned.

Because of practical limitations associated with arbitrarily positioning of pulses in adjacent frames, each frame may have to be divided into allowable and non-allowable time regions for positioning a pulse. One such limitation is associated with hardware limitation on minimum pulse-to-pulse time for respective positioning of two pulses on adjacent frames arbitrarily. The system disclosed in Barrett uses a fraction of frame time for encoding and designates the remainder as a RESET period.

Time-hopping coding efforts have primarily focused on correlation properties and only limited efforts have been applied towards using coding techniques to affect the spectral properties of pulse trains. Designed code generation techniques such as those disclosed by Barrett are employed solely due to the desirable correlation properties of the produced codes. Indeed, the spectral properties of individual codes within families of such codes vary tremendously from code to code. Although pseudorandom codes such as those disclosed by McCorkle can be used to produce pulse trains with relatively flat spectrums, the frequencies at which peaks and valleys occur within the energy spectrum vary significantly with each pseudorandom sequence.

Methods have been disclosed that combine pseudorandom coding and other pulse placement techniques to achieve notches in the energy spectrum of pulse trains. One approach is disclosed in U.S. Pat. No. 5,748,891 entitled "Spread Spectrum Localizers" by Fleming, et al. The approach described by Fleming uses a pseudorandom code to specify the positions of pulses that are each paired with an inverted pulse that is deterministically positioned such that a notch in the energy spectrum is produced at a desired frequency. However, such methods are significantly limited in their ability to otherwise shape the energy spectrum of a pulse train.

Because TM-UWB technology is applicable to a wide variety of applications including communications, radar, and positioning, different forms of pulse trains are needed that have varying spectral and correlation properties. Numerous methods for producing pulse trains with desirable correlation properties are available. But, few techniques exist for shaping the energy spectrum of pulse trains to meet spectral property requirements. Therefore, improved methods for shaping the energy spectrums of pulse trains are needed.

SUMMARY OF THE INVENTION

Generally described, the present invention optimizes the spectral properties of a pulse train for use by an impulse transmission system. A system and method generates at least one code specifying an initial pulse train having certain spectral properties and correlation properties, and modifies the temporal and/or non-temporal characteristics of pulses in the pulse train until acceptance criteria are met or 'best fit' is attained. Various methods for specifying characteristic value layouts are described including value range layouts, discrete value layouts, and combined value range-discrete value layouts, each of which can be employed using fixed or non-fixed values. Several code mapping approaches are described that can be used to map code elements to one or more values in one or more characteristic value layouts. Various approaches are described for modifying the characteristics of pulses within a pulse train. Methods are provided for determining the spectral properties of a pulse train and a weighting curve approach to assist in spectral shaping is described.

Pulse characteristics that can be modified include pulse position (in time), amplitude, width (in time), type, and polarity. Pulses can also be added to and deleted from a pulse train. Approaches for searching for optimal combinations of pulse characteristic values are described including single-sample and multiple-sample modify-and-compare methods and repeating single-sample and multiple-sample modify-and-compare methods. Single-pass and multiple-pass approaches to varying the order of varying characteristic values are also explained.

DETAILED DESCRIPTION

1. Overview

The present invention provides a system and method for generating a pulse train that has specifiable spectral response characteristics for use by an impulse transmission system. The method is embedded in a routine, which hereinafter will be called the Pulse Train Spectrum Optimizer (PTSO). The PTSO resides on a processing system that may comprise a computer executing a PTSO software.

Figure 1:
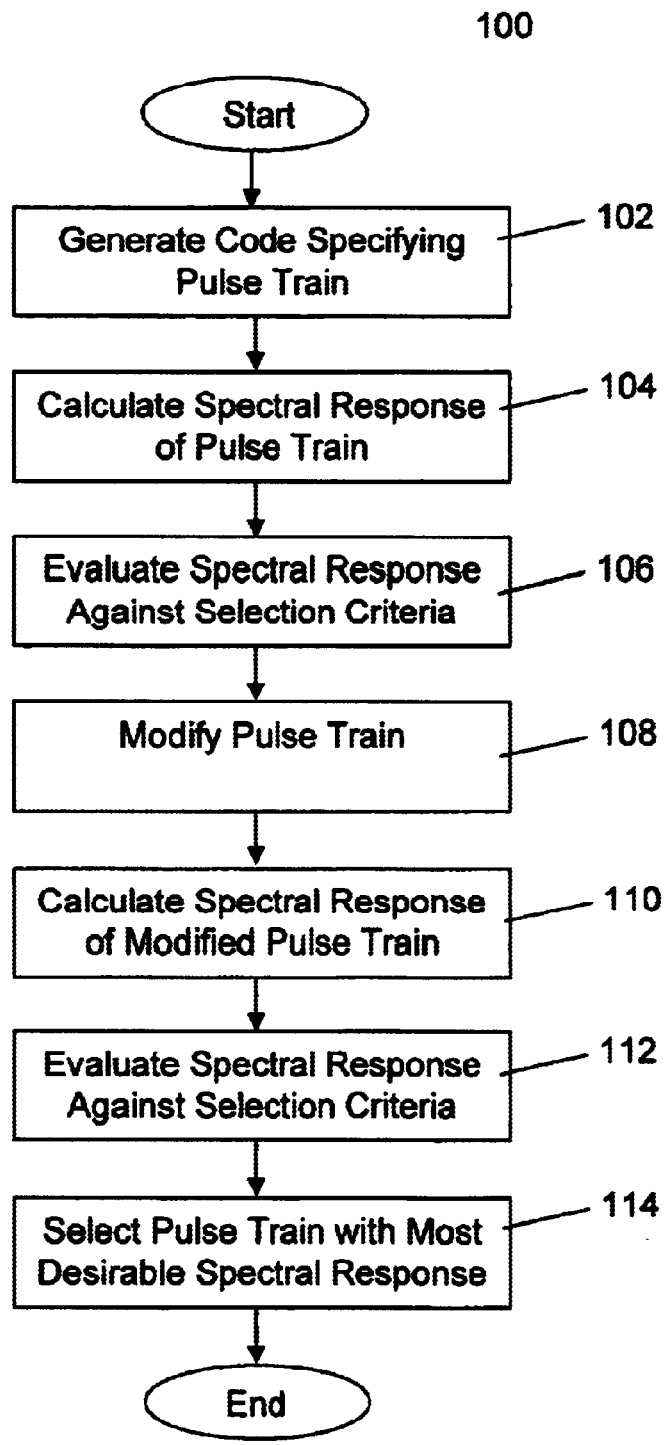
FIG. 1 is a flowchart of one exemplary optimization process in accordance with the present invention.

The PTSO generates one or more initial codes that specify the initial characteristics of pulses within a train of pulses that would be transmitted by an impulse transmission system over a repeating time period. The PTSO calculates the spectral response of the pulse train over one or more bandwidths of interest and evaluates the spectral response against established selection criteria. The PTSO then creates a modified pulse train sample where the pulse train is modified by, among other things, shifting, adding, deleting, inverting, changing the amplitude, changing the width, and/or changing the type of one or more pulses in the pulse train, or an equivalent thereof. It then calculates the spectral response of the modified pulse train sample over the bandwidths of interest and evaluates the spectral response against the selection criteria. The PTSO then determines whether the spectral response of the modified pulse train sample is more optimal than the spectral response of a pre-modified pulse train by comparing the two spectral response evaluations. The PTSO then selects the pulse train that more optimally meets or exceeds selection criteria as defined by one or more parameters. FIG. 1 provides a flow diagram 100 of an exemplary algorithm hereinafter called the Single-Sample-Modify and Compare algorithm.

Step 1 (102) Generate an initial code specifying a pulse train.

Step 2 (104) Calculate a spectral response of the pulse train specified by the initial code.

Step 3 (106) Evaluate the spectral response against a selection criteria parameter.

Step 4 (108) Modify the pulse train by modifying at least one pulse characteristic.

Step 5 (110) Calculate a spectral response of the modified pulse train.

Step 6 (112) Evaluate the spectral response against the selection criteria parameter.

Step 7 (114) Select a pulse train that most satisfies the selection criteria parameter.

Figure 2:
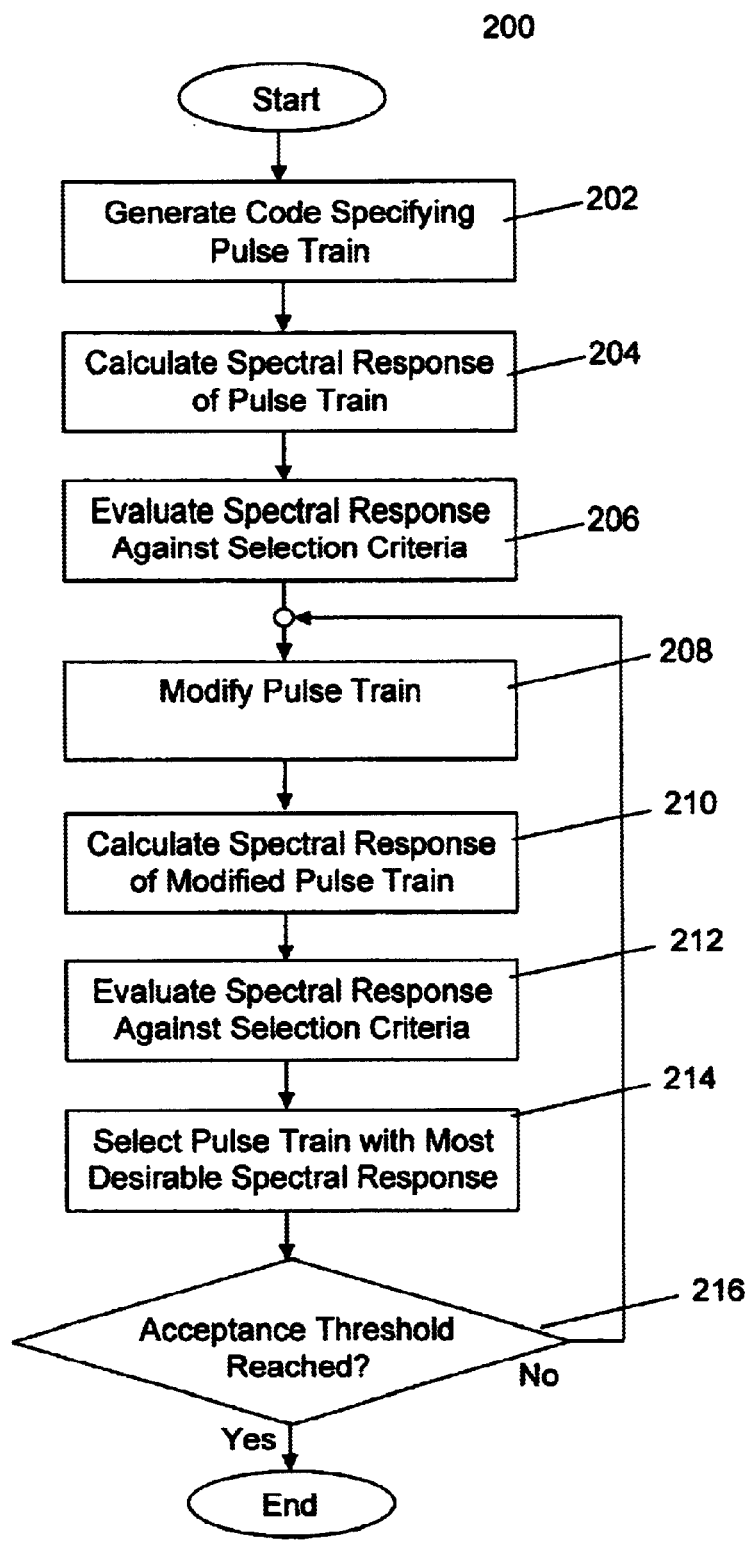
FIG. 2 is a flowchart of another exemplary optimization process in accordance with the present invention.

The PTSO can optimize the spectral properties of a pulse train by systematically repeating the process of modifying the pulse train, calculating its spectral response, evaluating the spectral response against the selection criteria, and selecting the best pulse train. The process can be repeated until a selection criteria threshold is satisfied or until the PTSO can no longer optimize the pulse train. Numerous alternative methods are available to one of ordinary skill in the art for systematically optimizing the pulse train. FIG. 2 provides a flow diagram 200 for another exemplary algorithm hereinafter called the Repeating Single-Sample Modify and Compare algorithm.

Step 1 (202) Generate an initial code specifying a pulse train.

Step 2 (204) Calculate a spectral response of the pulse train specified by the initial code.

Step 3 (206) Evaluate the spectral response against a selection criteria parameter.

Step 4 (208) Modify the pulse train by modifying at least one pulse characteristic.

Step 5 (210) Calculate a spectral response of the modified pulse train.

Step 6 (212) Evaluate the spectral response against the selection criteria parameter.

Step 7 (214) Select a pulse train that most satisfies the selection criteria parameter.

Step 8 (216) If a selection criteria threshold has not been reached; go to Step 4 (208). Else, end processing.

Figure 3:
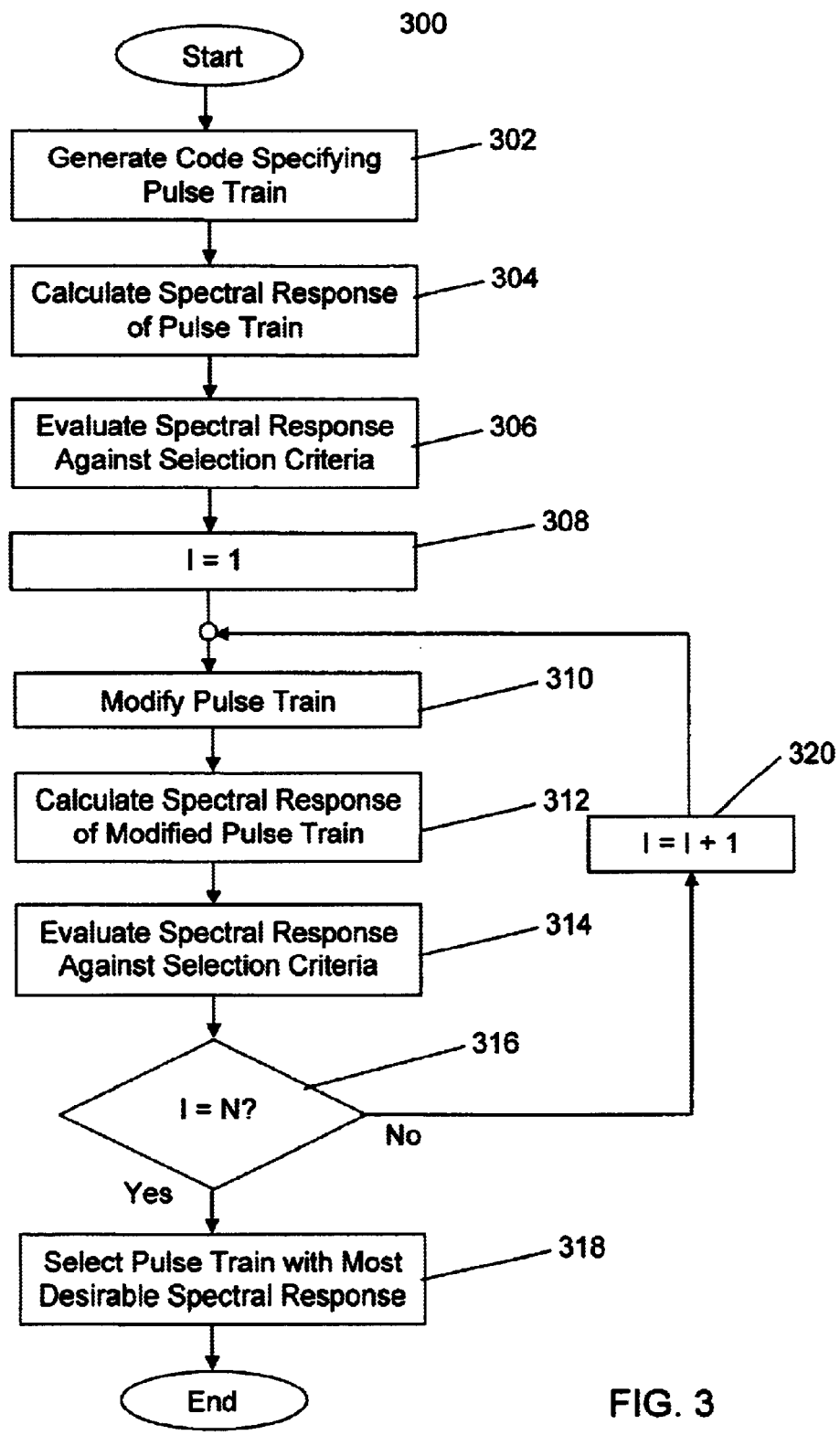
FIG. 3 is a flowchart of yet another exemplary process in accordance with the present invention.

The PTSO can also modify and evaluate multiple-samples before selecting ta desired pulse train sample, in which case the process of modifying the pulse train, calculating its spectral response, and evaluating the spectral response against the selection criteria is repeated for several modification samples prior to selecting the pulse train that more optimally meets or exceeds the selection criteria. FIG. 3 provides a flow diagram 300 for yet another exemplary algorithm hereinafter called the Multiple-sample Modify and Compare algorithm.

Step 1 (302) Generate an initial code specifying a pulse train.
Step 2 (304) Calculate a spectral response of the pulse train specified by the initial code.
Step 3 (306) Evaluate the spectral response against a selection criteria parameter.
Step 4 (308) Set a counter.
Step 5 (310) Modify the pulse train by modifying at least one pulse characteristic.
Step 6 (312) Calculate a spectral response of the modified pulse train.
Step 7 (314) Evaluate the spectral response against the selection criteria parameter.
Step 8 (316) If the counter is less than a number of desired samples, then increment counter (320) and go to Step 5 (310). Else, go to Step 9 (318).
Step 9 (318) Select a pulse train that most satisfies the selection criteria parameter.

Figure 4:
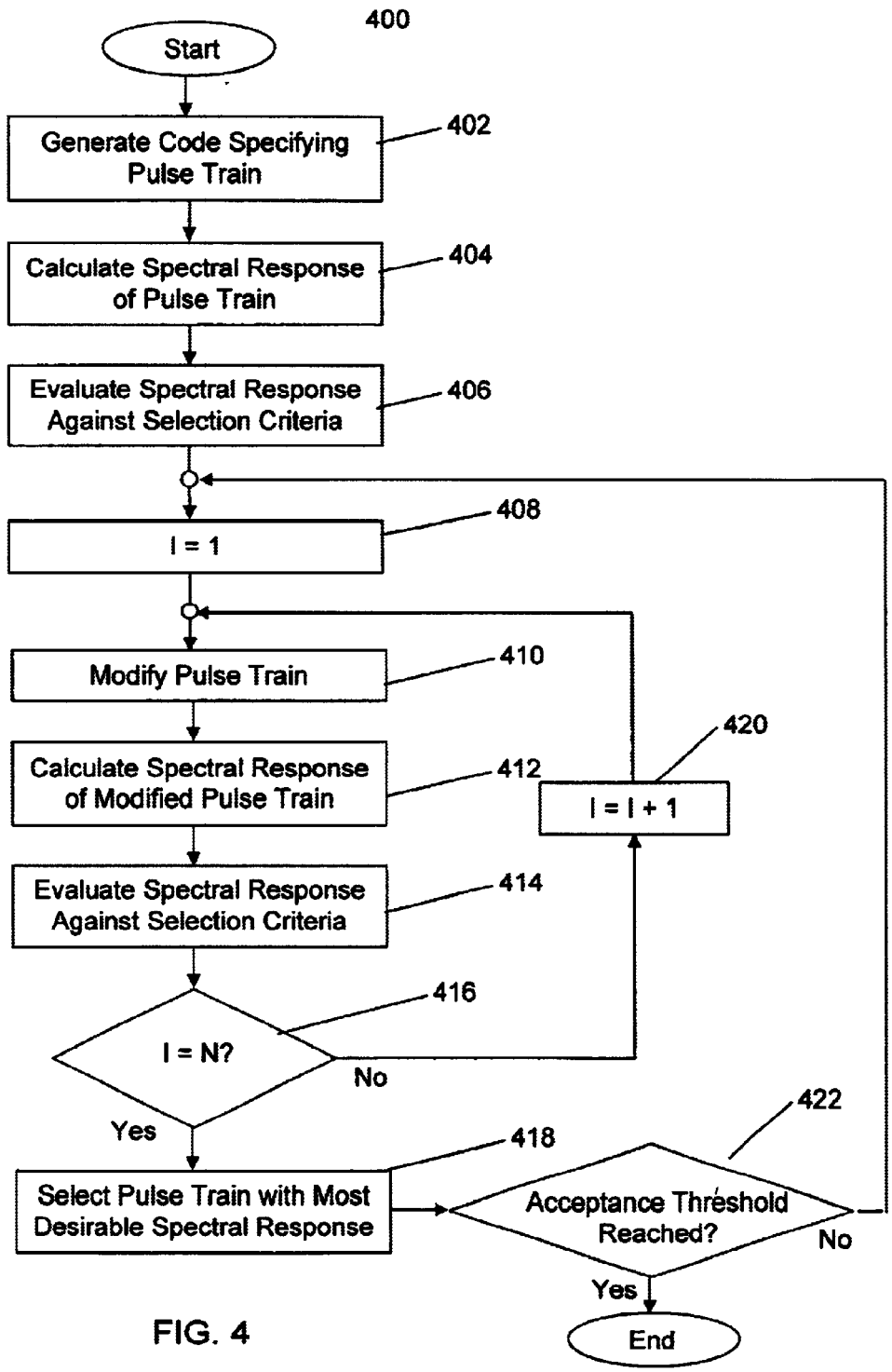
FIG. 4 is a flowchart of another optimization process in accordance with the present invention.

The PTSO can systematically repeat the multiple-sample approach until a selection criteria threshold is satisfied or until it can no longer optimize the pulse train. Accordingly, a plethora of methods for searching for and evaluating multiple-samples per selection decision are envisioned. FIG. 4 provides a flow diagram 400 for another algorithm hereinafter referred to as the Repeating Multiple-sample Modify and Compare algorithm.

Step 1 (402) Generate an initial code specifying a pulse train.
Step 2 (404) Calculate a spectral response of the pulse train specified by the initial code.
Step 3 (406) Evaluate the spectral response against a selection criteria parameter.
Step 4 (408) Set a counter.
Step 5 (410) Modify the pulse train by modifying at least one characteristic.
Step 6 (412) Calculate a spectral response of the modified pulse train.
Step 7 (414) Evaluate the spectral response against the selection criteria parameter.
Step 8 (416) If the counter is less than a number of desired samples, then increment counter (420) and go to Step 5 (410). Else, go to Step 9 (418).
Step 9 (418) Select a pulse train that most satisfies the selection criteria parameter.
Step 10 (422) If a selection criteria threshold has not been reached; go to Step 4 (408). Else, end processing.

The below described exemplary embodiments may pertain to given pulse characteristic. However, they are generally applicable to any temporal and/or non-temporal pulse characteristic. Temporal pulse characteristics may include, e.g., time position. Non-temporal pulse characteristic, may include, e.g., pulse amplitude, pulse width (in time), pulse polarity, and pulse type.

II. Pulse Characteristic Layouts

The pulse characteristics can be laid out based on defined parameters. Prior to beginning the pulse train optimization process, the PTSO accepts input parameters that define layouts of one or more temporal and/or non-temporal pulse characteristics. The PTSO also accepts input parameters that may establish temporal and/or non-temporal pulse characteristics that are to remain unchanged by the optimization process. In this way, the PTSO can be configured to vary one or more characteristics of pulses in a pulse train.

Pulse characteristic layouts can be defined in a multitude of ways to accommodate a wide variety of pulse transmission system applications. One type of pulse characteristic layout involves a range of pulse characteristic values. Another type of pulse characteristic layout involves discrete pulse characteristic values.

A. Value Range Layout

One exemplary embodiment involves a pulse characteristic value range layout where a range of pulse characteristic values is divided into smaller and smaller components to achieve a desired component resolution. The ranging of pulse characteristic values resides within a layout component. A pulse characteristic value can be mapped to a code element value and vice-versa. The below described exemplary embodiment performs this pulse characteristic value range layout using any of various temporal or non-temporal pulse characteristics.

Figure 5:
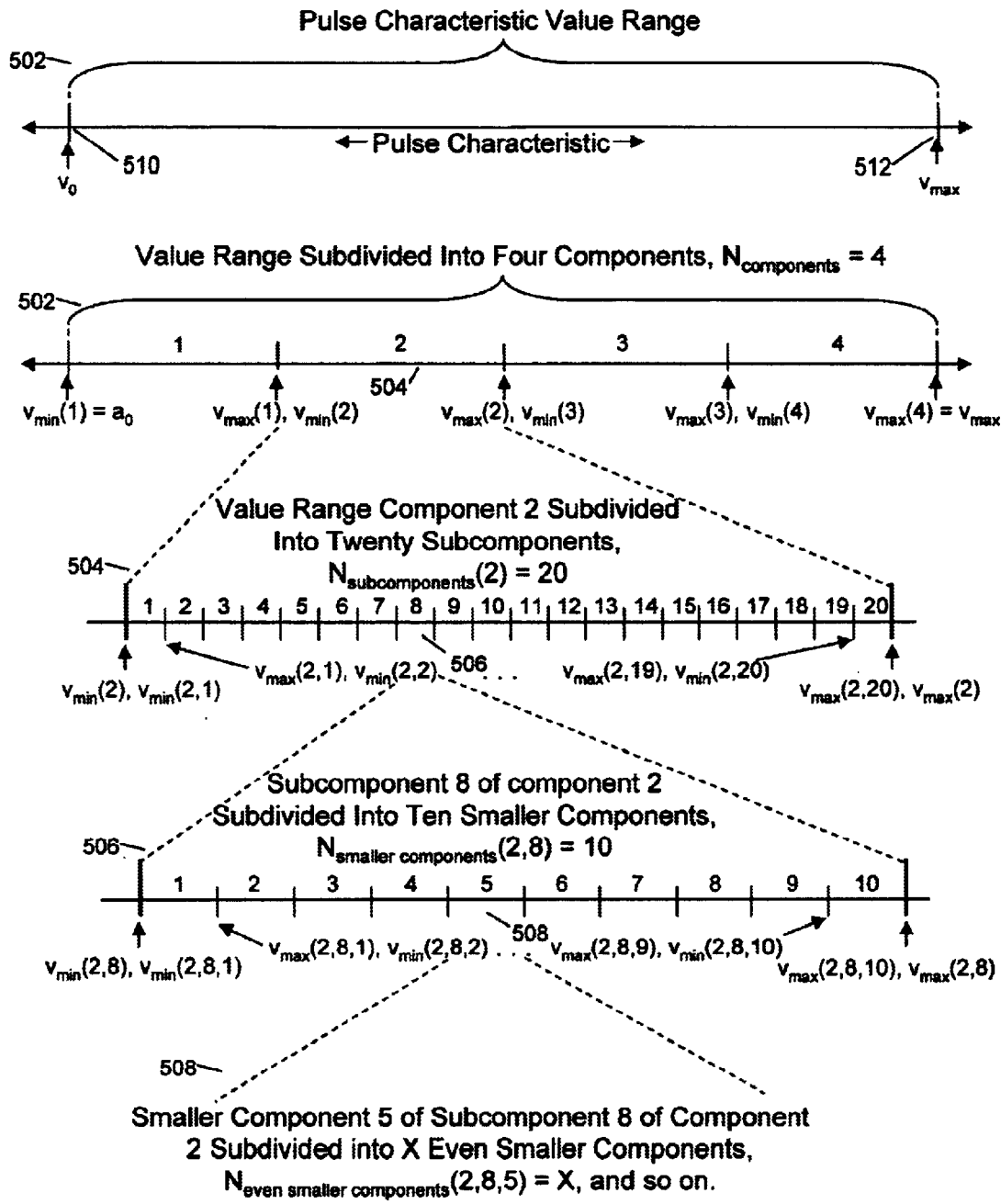
FIG. 5 illustrates a generic pulse characteristic value range layout.

FIG. 5 illustrates an exemplary value range layout which can represent a temporal, non-temporal, or combination of the two, pulse characteristic such as, e.g., timing of a pulse, and amplitude. FIG. 5 includes a value range layout 502. The pulse can take on characteristic values between a minimum value $v_0$ 510 and a maximum value $V_{max}$ 512 in layout 502. Layout 502, as shown, can be subdivided into component 504. Components 504 can in turn be divided into subcomponents 506. Subcomponents 506 can in turn be divided into smaller components 508. Smaller components 508 can then be divided into even smaller components, as shown. The process of subdividing components can be repeated, ad infinitum, so that smaller and smaller components can be obtained.

The process of subdividing a layout into components is now described in detail. In particular, FIG. 5 depicts an exemplary embodiment of pulse characteristic value range layout parameters. Specifically, a pulse characteristic value range 502 is shown. As depicted in FIG. 5, two layout parameters, $v_0$ and $v_{max}$, can be specified to define a pulse characteristic value range 502 bounded by a minimum value of $v_0$ and a maximum value of $v_{max}$. A second layout parameter, $N_{components}$, can be specified to divide the value range 502 into one or more components 504 of the same size, or of different sizes, with each component 504 (indexed by the letter-n) having a minimum value, $v_{min}(n)$, and a maximum value, $v_{max}(n)$, where n=1 to $N_{components}$.

The number and size of components 504 used in a given layout can be selected for various reasons. For example, the number and size of components 504 can be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, inter alia. When different sized components 504 are employed, minimum and maximum values can be specified for each component 504 indexed by n, wherein the minimum value for a given component, $v_{min}(n)$, equals the maximum value of the preceding component, $v_{max}(n-1)$, or $v_0$, and the maximum value of a given component, $v_{max}(n)$, equals the minimum value for the following component, $v_{min}(n+1)$, or $v_{max}$. When same sized components 504 are employed, the value range is evenly divided such that $v_{max}(n)-v_{min}(n)$ is equal for each component 504 indexed by n.

An array of layout parameters, $N_{subcomponents}(N_{components})$ can be specified to subdivide each component 504 into subcomponents 506 of the same size, or different sizes, with each subcomponent 506 (indexed by m) of the component 504 (indexed by n) having a minimum value, $v_{min}(n,m)$, and a maximum value, $v_{max}(n,m)$, where n=1 to $N_{components}$ and m=1 to $N_{subcomponents}(n)$. As with components 504, the number and size of subcomponents 506 for a given component 504 used in a given value range layout 502 can also be tailored to meet, e.g., specific application requirements, to remain within system implementation limits, to achieve one or more of a variety of system characteristics in areas such as, e.g., performance (i.e., bit rate), reliability (i.e., bit error rate), system-simplicity, ease-of-use, etc., and/or for many other reasons. When different sized subcomponents 506 are employed, minimum and maximum values are specified for each subcomponent 506 indexed by m of each component 504 indexed by n, wherein the minimum value for a given subcomponent, $v_{min}(n,m)$, equals the maximum value of the preceding subcomponent, $v_{max}(n,m-1)$, or the minimum value of the component in which the subcomponent resides, $v_{min}(n)$, and the maximum value of a given subcomponent, $v_{max}(n,m)$, equals the minimum value for the following subcomponent, $v_{min}(n,m+1)$, or the maximum value of the component in which the subcomponent resides, $v_{max}(n)$. When same sized subcomponents 506 are employed, components are evenly divided such that $v_{max}(n,m)-v_{min}(n,m)$ is equal for each subcomponent 506 indexed by m of a component 504 indexed by n or for all components such that all subcomponents 506 of a given component 504 are of the same size, wherein subcomponent sizes may vary from component to component or all subcomponents of all components are of the same size depending on the sizes of the components and the numbers of subcomponents in the components.

In a manner consistent with the subdivision of components into subcomponents, additional multi-dimensional arrays of layout parameters can be used to further subdivide subcomponents 506 into smaller components 508 (as shown) of the same or different sizes, ad infinitum, until a smallest desirable component resolution is attained, with components at each resolution level having a minimum value, $v_{min}(n,m, \ldots, a)$, and a maximum value, $v_{max}(n,m, \ldots, a)$, where n=1 to $N_{components}$, m=1 to $N_{subcomponents}(n)$, $\ldots$, and a=1 to $N_{smallest\_components}(n,m, \ldots)$. Such further subdivision of subcomponents into smaller and smaller components enables systems with finer and finer tuning resolution and thus higher and higher fidelity, increases modulation accuracy, and can be useful for other purposes. As with components 504 and subcomponents 506, the number and size of these smaller components 508 can also be tailored, e.g., to meet specific application requirements, to remain within system implementation limits, to achieve one or more of a variety of system characteristics in areas such as performance (i.e., bit rate), reliability (i.e., bit error rate, system-simplicity, ease-of-use, etc., and/or for many other reasons. When different sizes of these smaller components 508 are employed, minimum and maximum values are specified for each smaller component 508 (indexed by a), wherein the minimum value for a component, $v_{min}(n,m, \ldots, a)$, equals the maximum value of the preceding component, $v_{max}(n,m, \ldots, a-1)$, or the minimum value of the next higher level component in which the component resides, $v_{min}(n,m, \ldots)$, and the maximum value of a given component, $v_{max}(,n, \ldots, a)$, equals the minimum value for the following component, $v_{min}(n,m, \ldots, a+1)$, or the maximum value of the next higher level component in which the component resides, $v_{max}(n,m, \ldots)$. When same sized smaller components 508 are employed, the next higher level components 506 are evenly divided such that $v_{max}(n,m, \ldots, a)-v_{min}(n,m, \ldots, a)$ is equal for each smaller component 508 indexed by a of a given next higher level component or for all next higher level components such that all components of a given next higher level component are of the same size, wherein component sizes may vary from next higher level component to next higher level component or all components of all higher level components are of the same size depending on the sizes of the next higher level components and the numbers of components in the next higher level components.

At the top of FIG. 5, pulse characteristic value range 502 is depicted that is bounded by endpoints of $v_0$ and $v_{max}$. Beneath this illustration an equivalent value range 502 is shown that has been subdivided into four components 504 by setting the layout parameter $N_{components}$ to a value of four (4), and the size of each component has been established by setting the minimum and maximum values of each component, $v_{min}(n)$ and $v_{max}(n)$, where n=1 to 4. An enlargement of the second component 504 is then shown where the component has been subdivided into twenty subcomponents 506 by setting the layout parameter $N_{subcomponents}(2)$ to a value of twenty (20), and the size of each subcomponent 506 has been established by setting the minimum and maximum values of the subcomponents 508 within component two 504, $v_{min}(n,m)$ and $v_{max}(n,m)$, where n=2 and m=1 to 20. As illustrated, there are 20 subcomponents 506 in component 504, indexed by n=2, and m=1 to 20, labeled $v_{min}(2,1)$ and $v_{max}(2,20)$.

An enlargement of the eighth subcomponent 506 of component two 504 is then shown where the subcomponent 506 has been subdivided into ten smaller components 508 by setting the layout parameter $N_{smaller\_components}(2,8)$ to a value of ten (10), and the size of each smaller component 508 has been established by setting the minimum and maximum values of the smaller components within subcomponent eight 506 of component two 504, $v_{min}(n,m,l)$ and $v_{max}(n,m,l)$, where n=2, m=8, and l=1 to 10. As illustrated, there are 10 smaller components 508 in subcomponent 506, indexed by n=2, m=8, and l=1 to 10, labeled $v_{min}(2,8,1)$ and $v_{max}(2,8,10)$.

It is then shown that these smaller components 508 could be subdivided into x even smaller components (whose size is not shown) using another layout parameter [e.g., $N_{even\_smaller\_components}(2,8,5)=x$], which can be further subdivided, ad infinitum. Also not shown in FIG. 5, are enlargements of the other components 504, subcomponents 506, and smaller components 508, which in an exemplary embodiment could also contain twenty subcomponents 506, ten smaller components 508, and x even smaller components, respectively.

By subdividing a value range layout into levels of smaller and smaller components and by varying or not varying the size of components at different levels, a multitude of different layout permutations can be defined. Examples of such permutations are included in a co-owned patent application entitled "METHOD FOR SPECIFYING PULSE CHARACTERISTICS USING CODES", U.S. patent application Ser. No. 09/638,153 which is a Continuation-In-Part application for pending U.S. patent application Ser. No. 09/592,290, which are hereby incorporated by reference. It should be noted, however, that other layouts including, e.g., infinite combinations of similar and different sized components, could also be used within the scope of the present invention. It should also be noted that the pulse characteristics could include any of various temporal, non-temporal, or both temporal and non-temporal characteristics.

B. Non-Allowable Regions Within Value Range Layouts

One or more non-allowable regions can be defined in a characteristic value range layout within which a characteristic value is not allowed. A non-allowable region may fully or partially include one or more components, subcomponents or smaller components. A non-allowable region can be based solely on value position within a component, subcomponent, or smaller component. For example, a non-allowable region can be defined such that a pulse characteristic value cannot be less than the minimum value or greater than the maximum value of a given component. Non-allowable regions may alternatively be bounded by minimum and maximum values within a value range layout.

Non-allowable regions can also be defined relative to other pulse characteristic values. For example, a minimum value difference between pulse characteristic values can be established by defining a non-allowable region about the characteristic value of another pulse such as the preceding pulse, succeeding pulse, or in other pulse. Similarly, a maximum value difference between pulse characteristic values can be established by defining a non-allowable region consisting of all values greater than or less than some difference from the characteristic value of another pulse. Non-allowable regions can also be defined that are bounded by a minimum and maximum difference in value between the characteristic value of the pulse and the characteristic value of another pulse.

Figure 6:
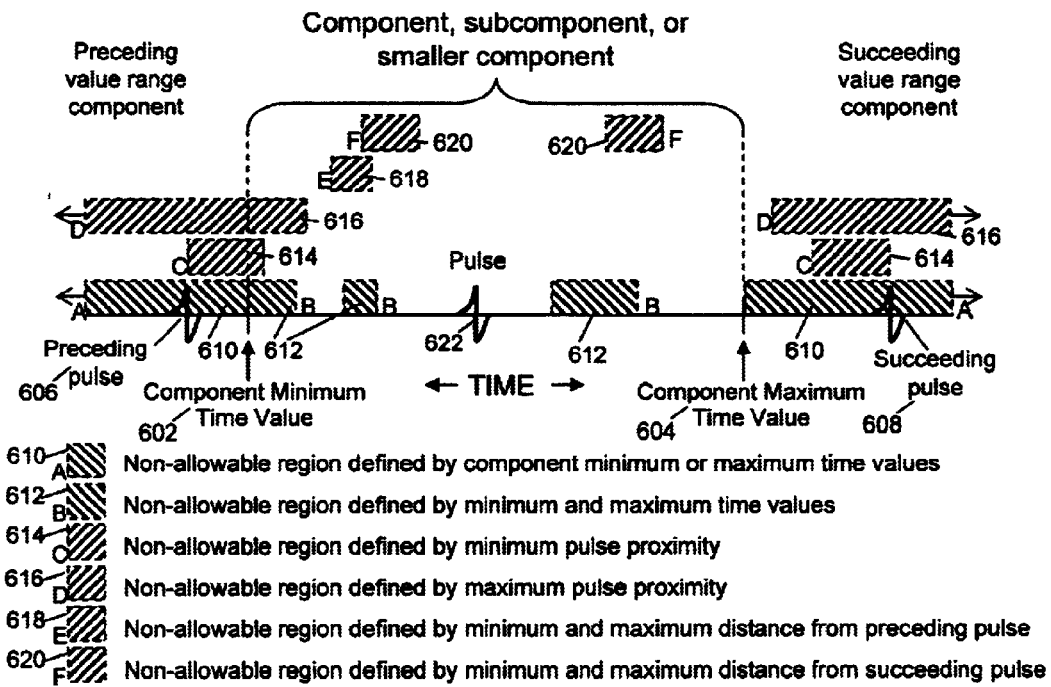
FIG. 6 illustrates a temporal pulse characteristic value range layout.
Figure 6:
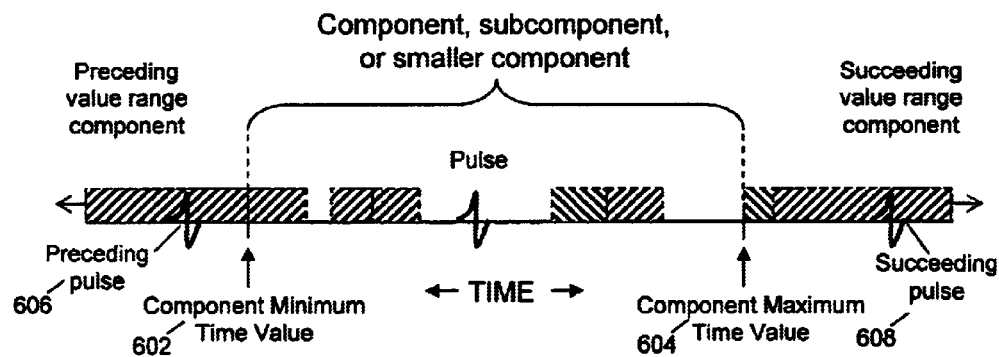

FIG. 6 depicts non-allowable regions within a temporal pulse characteristic value range layout. In the top portion of the figure, a component, subcomponent, or smaller component 622 is shown in FIG. 6, which is bounded by a minimum time value 602 and a maximum time value 604. A pulse 603 is shown at a position within the component and a preceding pulse 606 and succeeding pulse 608 are shown at positions within the preceding and succeeding time period components, respectively. Non-allowable regions are shown in layers to illustrate that they, can overlap one another. Two non-allowable regions 610 are denoted A, which are used to maintain the correlation properties of a code, where the leftmost region 610 consists of all time prior to the minimum time value 602 of the component to which a code element value is mapped and the rightmost region 610 consists of all time after the maximum time value 604 of the same component. Three non-allowable regions 612, denoted B, are defined that are bounded by minimum and maximum time values. Two regions 614, shown as C, illustrate the application of a minimum proximity limit, where the leftmost region 614 represents a region where a pulse 603 cannot be placed because it would violate the minimum proximity limit relative to the preceding pulse 606, and the second region 614 represents a region where a pulse 603 cannot be placed because it would violate the minimum proximity limit relative to the succeeding pulse 608. Similarly, two regions 616, shown as D, illustrate the application of a maximum proximity limit, where the leftmost region 616 represents a region where a pulse 603 cannot be placed because it would violate the maximum proximity limit relative to the succeeding pulse 608, and the rightmost region 616 represents a region where a pulse 603 cannot be placed because it would violate the maximum proximity limit relative to the preceding pulse 606. One non-allowable region 618, shown as E, is bounded by a minimum and maximum distance from the preceding pulse 606. Two other non-allowable regions 620, identified as F, are bounded by a minimum and maximum distance from the succeeding pulse 608. The bottom portion of the figure depicts the combined effect of the non-allowable regions where the separated layers in the upper portion of the figure are overlaid to show that a given position within a time period component is either allowable or non-allowable. Someone skilled in the art will understand that non-allowable regions can be similarly defined for a non-temporal pulse characteristic value range layout as further described in a co-owned patent application entitled "A METHOD FOR SPECIFYING NON-ALLOWABLE PULSE CHARACTERISTICS", U.S. patent application Ser. No. 09/638,154 which is a Continuation-In-Part application for pending U.S. patent application Ser. No. 09/592,289, which is hereby incorporated by reference.

C. Discrete Value Layouts

Figure 7A:
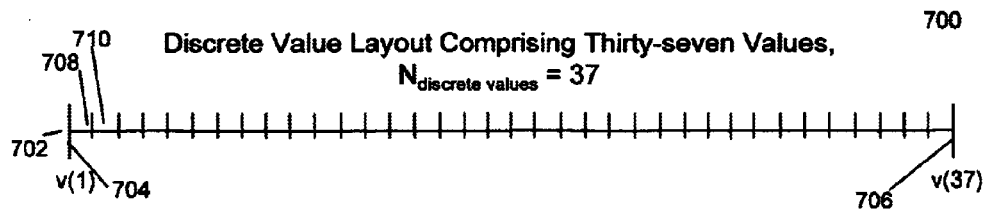
FIG. 7a illustrates an exemplary discrete value layout.
Figure 7B:
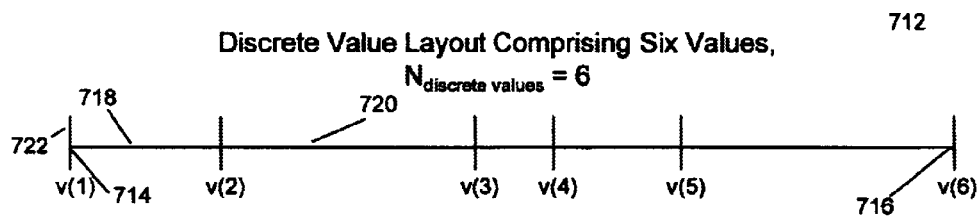
FIG. 7b illustrates another exemplary discrete value layout.

Another exemplary embodiment of the present invention defines a layout of pulse characteristic values by specifying a layout of discrete characteristic values to which individual code elements can map. As depicted in FIGS. 7a and 7b, a layout parameter, $N_{discrete\ values}$ can be specified to identify some number of discrete values within a layout having a value, v(n), with an index n, where n=1 to $N_{discrete\ values}$. Discrete values may, e.g., be evenly distributed, or not, as depicted in FIGS. 7a and 7b, respectively.

Beginning with FIG. 7a, a diagram 700 illustrates an exemplary embodiment in which thirty-seven (37) evenly-distributed (the first two width values are labeled 708, 710) discrete characteristic values, v(1) 704 through v(37) 706, are shown. In the exemplary embodiment, the number of discrete values 704, 706 within layout 702 is thirty-seven (37) and is referred to as $N_{discrete\ values}=37$.

FIG. 7b depicts, in an exemplary embodiment, a diagram 712 illustrating six (6) non-evenly-distributed (the first two width values are labeled 718 and 720) discrete characteristic values, v(1) 714 through v(6) 716. In the exemplary embodiment, the number of discrete values 714, 716 within layout 722 is six (6) and is referred to as $N_{discrete\ values}=6$.

Examples of temporal and non-temporal discrete value layouts are included in a co-owned patent application entitled "METHOD FOR SPECIFYING PULSE CHARACTERISTICS USING CODES", U.S. patent application Ser. No. 09/638,153 which is a Continuation-In-Part application for pending U.S. patent application Ser. No. 09/592,290, which was previously cited.

D. Combinations of Value Range and Discrete Value Layouts

In one exemplary embodiment of the present invention, the discrete value layout embodiments illustrated in FIGS. 7a and 7b, described above, can be combined with an embodiment of a value range layout such as, e.g., the value range layout 502 of FIG. 5, enabling code element values to specify, e.g., a component 504 within the value range layout 502 and a discrete value within the component 504 (not shown). The use of a combination of the discrete value layout and value range layout approaches is shown in FIG. 8.

Specifically, FIG. 3 illustratively depicts a diagram 800 showing an exemplary embodiment of the invention using a combination of a discrete value layout similar to the one depicted in FIG. 7a, and a value range layout similar to that shown in FIG. 5. Referring now to FIG. 8, a value range layout 802 is subdivided into four (4) components (the first two are labeled 804, 806) that are subdivided into nine (9) subcomponents (the first two are labeled 812, 814). Component 806 is shown with a subcomponent 812 which has been further expanded to illustrate discrete values from $v_{min}(2,5)$ 824 to $v_{max}(2,5)$ 826. Thus, as illustrated, each subcomponent 812 contains 27 discrete values. The layout 802 of the exemplary embodiment of diagram 800 could, e.g., be specified by setting $N_{components}$=4, $N_{subcomponents}$ (1–4)=9, and $N_{discrete\ values}$(1–4,1–9)=27.

Figure 8:
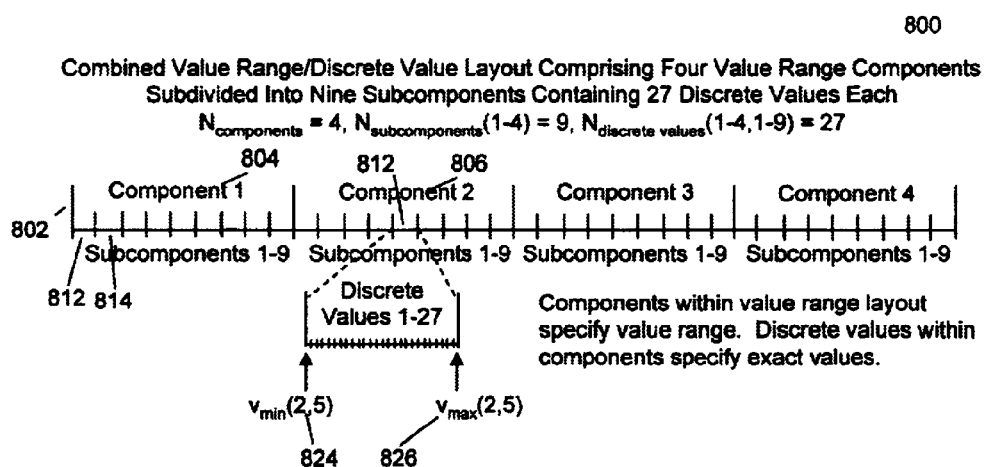
FIG. 8 illustrates an exemplary combined value range-discrete value layout.

In an exemplary embodiment, a combined value range/discrete value layout such as that depicted in FIG. 8 is used with a combination of two codes, in which case the first code specifies the components in which to place pulses and the second code specifies the initial positions of pulses within the components specified by the first code. In such a case, the PTSO might be configured to vary the positions of pulses within the components specified by the first code, thereby maintaining the correlation properties of the pulse train. This nested combination codes approach is described in greater detail in a co-owned patent application entitled "A METHOD AND APPARATUS FOR APPLYING CODES HAVING PRE-DEFINED PROPERTIES", U.S. patent application Ser. No. 09/638,046 which is a Continuation-In-Part application for pending U.S. patent application Ser. No. 09/591,690. which was previously cited.

E. Non-Fixed Layouts

In another exemplary embodiment of the invention, the value range layout and the discrete value layout embodiments can be employed as non-fixed layouts also referred to as delta layouts. Where a 'fixed' value range layout defines a range of values between, e.g., values $v_0$ and $v_{max}$, a 'non-fixed' delta value range layout can specify a range of delta values between, e.g., delta values $\Delta v_0$ and $\Delta v_{max}$, where the delta value range can be divided into components and subcomponents in the same manner as a fixed value range can be divided.

Similarly, where discrete values are defined in a discrete value layout, discrete delta values can also be defined in a discrete delta value layout. These non-fixed layout exemplary embodiments of specifying pulse characteristics depend on the characteristics of the previous pulse. Specifically, the value of a given pulse's characteristic can equal the characteristic value of the previous pulse plus a delta characteristic value. The delta characteristic value can be determined by mapping a code element value to a defined delta value range layout or to a discrete delta value layout, as appropriate to a person having ordinary skill in the relevant art.

Non-fixed layouts are described in greater detail in a co-owned patent application entitled "A METHOD AND APPARATUS FOR MAPPING PULSES TO A NON-FIXED LAYOUT", U.S. patent application Ser. No. 09/631,151 which is a Continuation-In-Part application for pending U.S. patent application Ser. No. 09/591,691, which are hereby incorporated by reference.

III. Code Mapping

A multitude of exemplary code mapping embodiments may be employed in conjunction with pulse characteristic value layouts to accommodate pulse transmission system implementation requirements and to optimize system performance for specific applications. Accordingly, the PTSO accepts input parameters that define the desired method for mapping a code to the defined layout.

A code specifying pulse characteristics can include elements having, e.g., integer or floating-point numbers that map to characteristic values within defined characteristic layouts. Additionally, an integer or floating-point code element can be used to specify multiple pulse characteristics. For example, the non-fractional part of a floating-point number may map to one pulse characteristic value, while the fractional part of the same floating-point number may map to a different pulse characteristic value. Other alternative mapping schemes involve translating code element values into binary numbers, or bits, and mapping translated groups of bits to characteristic values.

In an exemplary embodiment, once an integer value or non-fractional part of a floating-point value has been used to map to a value range corresponding to, e.g., a component, subcomponent, or smaller component (or even a smaller component, ad infinitum), an established offset value can be used to specify the exact characteristic value within the component, subcomponent, or smaller component. An absolute offset value can be used to specify an exact characteristic value that is a common value difference (or delta) from the minimum characteristic values of the components, subcomponents, or smaller components to which code elements are mapped.

Alternatively, in another exemplary embodiment, a relative position offset value can be used to specify an exact characteristic value that is a fraction of the difference between the minimum and maximum characteristic values of the components, subcomponents, or smaller components (or even smaller components, ad infinitum) to which code elements are mapped. For floating-point codes, the fractional part of each floating-point code element can be used to specify the relative offset used to specify an exact characteristic value that is a fraction of the difference between the minimum and maximum characteristic values of the component, subcomponent, or smaller component (or even smaller component, calculated ad infinitum) to which the non-fractional part of the floating-point code element is mapped.

Unlike integer codes, where an absolute or relative offset value can be used to specify exact characteristic values in a common manner, the fractional portions of floating-point values can vary per code element. The variance of fractional portions of floating-point values per code element, allows each pulse characteristic value to be established independent of other pulse characteristic values.

Detailed descriptions of these and other code mapping approaches are included in a co-owned patent application entitled "METHOD FOR SPECIFYING PULSE CHARACTERISTICS USING CODES", U.S. patent application Ser. No. 09/638,153 which is a Continuation-In-Part application for pending U.S. patent application Ser. No. 09/592,290, previously incorporated by reference. It should be noted, however, that other code mapping approaches including, e.g., infinite combinations of binary bit groupings, could also be used within the scope of the present invention.

IV. Numerical Code Generation

Various numerical code generation methods can be used to produce one or more codes to specify the initial characteristics of pulses in the pulse train to be optimized by the PTSO. Each method produces codes that, when employed, result in a pulse train having certain correlation and/or spectral properties, and therefore has advantages and disadvantages relative to the application(s) of the impulse transmission system employing the pulse train. Generally, codes fall into one of two categories: designed codes and pseudo-random codes.

A designed code may be generated using a quadratic congruential, hyperbolic congruential, linear congruential, Costas array or other such numerical code generation technique designed to generate codes guaranteed to have certain correlation properties. Each of these alternative code generation techniques has certain characteristics to be considered in relation to the application of the pulse transmission system employing the code. For example, Costas codes have nearly ideal autocorrelation properties but somewhat less than ideal cross-correlation properties, while linear congruential codes have nearly ideal cross-correlation properties but less than ideal autocorrelation properties. In some cases, design tradeoffs may require that a compromise between two or more code generation techniques be made such that a code is generated using a combination of two or more techniques. An example of such a compromise is an extended quadratic congruential code generation approach that uses two 'independent' operators, where the first operator is linear and the second operator is quadratic. Accordingly, one, two, or more code generation techniques or combinations of such techniques can be employed to generate a code without departing from the scope of the invention.

A pseudorandom code may be generated using a computer's random number generator, binary shift-register(s) mapped to binary words, a chaotic code generation scheme, or another well-known technique for generating seemingly random sequences. Such 'random-like' codes are attractive for certain applications since they tend to spread spectral energy over multiple frequencies while having 'good enough' correlation properties, whereas designed codes may have superior correlation properties but have spectral properties that may not be as suitable for a given application.

Computer random number generator functions commonly employ the linear congruential generation (LCG) method or the Additive Lagged-Fibonacci Generator (ALFG) method. Alternative methods include inversive congruential generators, explicit-inversive congruential generators, multiple recursive generators, combined LCGs, chaotic code generators, and Optimal Golomb Ruler (OGR) code generators. Any of these or other similar methods can be used to generate a pseudorandom code without departing from the scope of the invention, as will be apparent to those skilled in the relevant art.

Detailed descriptions of the above-described code generation techniques are included in a co-owned patent application entitled "A METHOD AND APPARATUS FOR POSITIONING PULSES IN TIME", U.S. patent application Ser. No. 09/638,150 which is a Continuation-In-Part application for pending U.S. patent application Ser. No. 09/592,249, which is hereby incorporated by reference. It should be noted that alternative methods for producing a code or codes to specify initial pulse train characteristics could be employed without departing from the scope of the invention as would be understood by one skilled in the art.

V. Mapping Code Elements to Pulse Characteristics

After one or more codes have been generated, the initial characteristics of pulses in a repeating pulse train are established by mapping the generated code(s) to the defined layout(s) according to the desired mapping approach(es). As appropriate, the PTSO establishes certain characteristics according to any input parameters establishing characteristics to remain unchanged by the optimization process.

If a value range layout was employed, an offset value may be used to specify an exact value within the value range of the component to which a given code element maps. In an exemplary embodiment, a code may be used to specify components in which to place pulses and an offset value may be used to position pulses in the center of the specified components. In such a case, the PTSO might be configured to optimize the position of the pulses within the specified components, thereby maintaining the correlation properties of the employed code. This technique may also be used to establish non-temporal pulse characteristic values as would be understood by one skilled in the art.

The following description provides a detailed example of the mapping of QC codes to a temporal value range layout such that the specified pulse train has certain desirable correlation properties. For the example, it is assumed that input parameters are used to establish non-temporal pulse characteristics, e.g., pulse amplitude), that are to remain unchanged by the PTSO. It should be noted that the below described exemplary code element mapping approach is generally applicable to map codes produced by any of the previously described code generation methods to fixed or non-fixed, value range and/or discrete value layouts of temporal and/or non-temporal pulse characteristic values, as will be recognized by persons skilled in the relevant arts. It should also be noted that the value range layout used in the example does not include non-allowable regions. Had non-allowable regions been included, methods for positioning pulses in the presence of non-allowable regions may be employed as described in a co-owned patent application entitled "A METHOD AND APPARATUS FOR POSITIONING PULSES USING A LAYOUT HAVING NON-ALLOWABLE REGIONS", U.S. patent application Ser. No. 09/637,878 which is a Continuation-In-Part application for pending U.S. patent application Ser. No. 09/592,249, which is hereby incorporated by reference.

Figure 9:
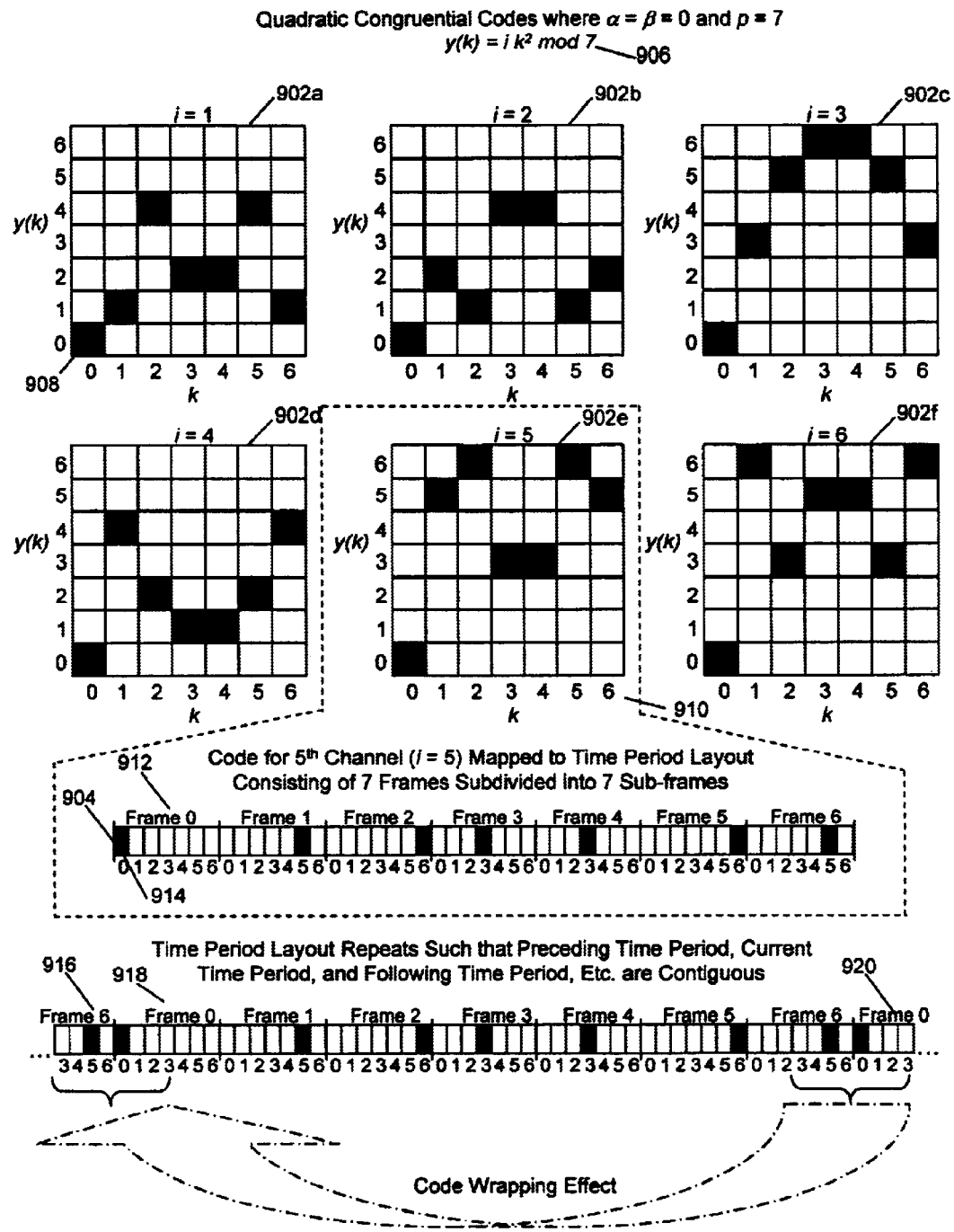
FIG. 9 depicts generation of a family of quadratic congruential codes.

FIG. 9 depicts the generation of QC codes 902a–902f and the mapping of the $5^{th}$ code 902e to a time layout 904. The code generation equation, $y(k)=i\ k^2 \bmod 7$ (906), is consistent with the general form discussed earlier where $\alpha$ and $\beta$ have both been assigned a value of 0, and p has been assigned a value of 7. Six codes 902a–902f representing six channels are produced and displayed in matrix form where the darkened squares 908 represent code element values. Thus for channels i=1 to 6, the six codes 902a–902f presented are {0,1,4,2,2,4,1}, {0,2,1,4,4,1,2}, {0,3,5,6,6,5,3}, {0,4,2,1,1,2,4}, {0,5,6,3,3,6,5}, and {0,6,3,5,5,3,6}. The outlined region 910 about the $5^{th}$ code 902e(i=5) illustrates how the code 902e maps to a time layout 904 consisting of seven components 912, or frames, where each frame 912 is subdivided into seven subcomponents 914, or subframes. Each column k maps to a frame 912 and the row y(k) highlighted for each column k represents the subframe 914 y(k) in which to place a pulse. The bottom of the figure illustrates how the time layout repeats. As shown, the last frame of a preceding time layout 916 is contiguous with the first frame of a current time layout 918 and the last frame of the current time layout 918 is contiguous with the first frame of the following time layout 920. Thus, whenever the start of a time layout 918 is shifted in time by some offset, a code wrapping effect occurs.

Figure 10:
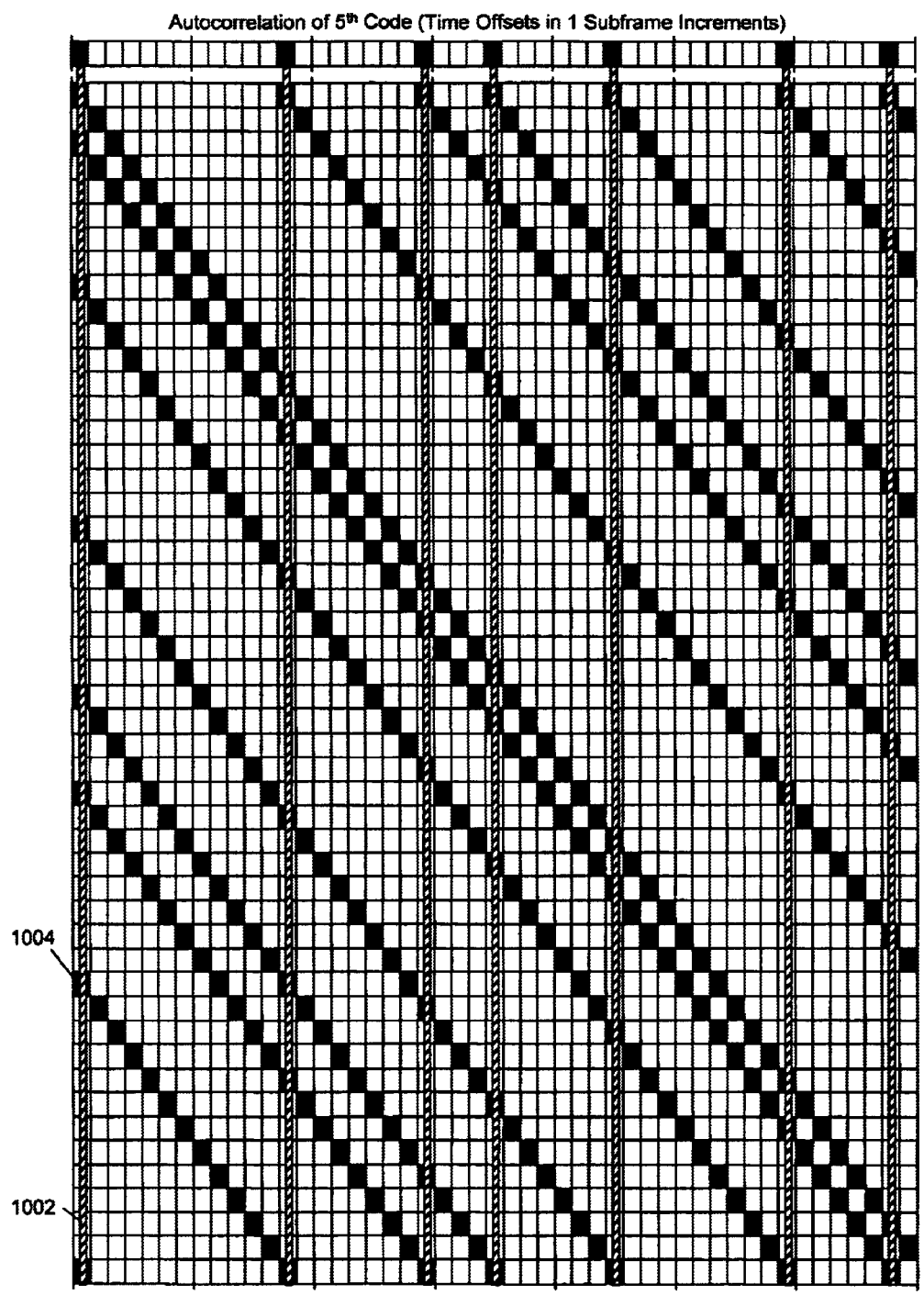
FIG. 10 illustrates autocorrelation properties of the $5^{th}$ channel code of FIG. 9.
Figure 11A:
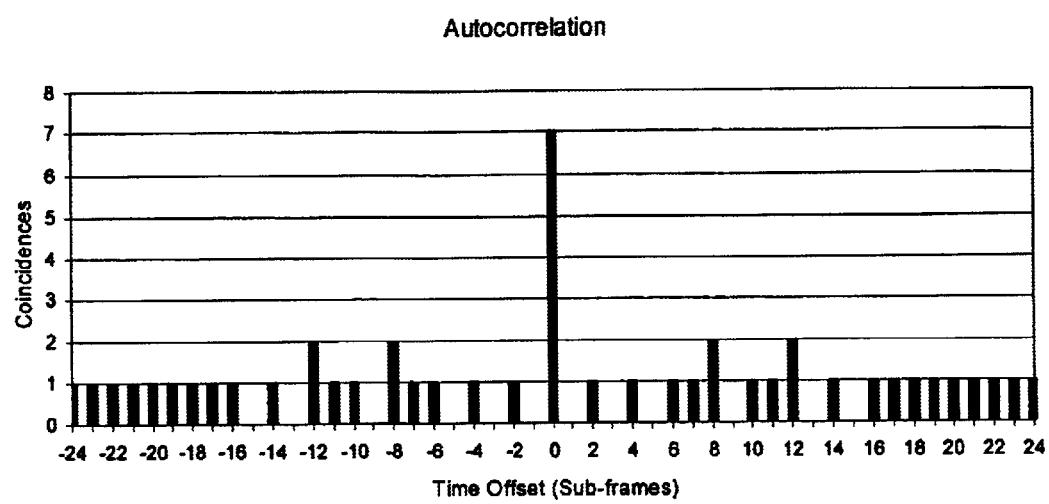
FIG. 11a is an exemplary plot diagram for illustrating the number of coincidences against a time offset in the example of FIG. 9.
Figure 11B:
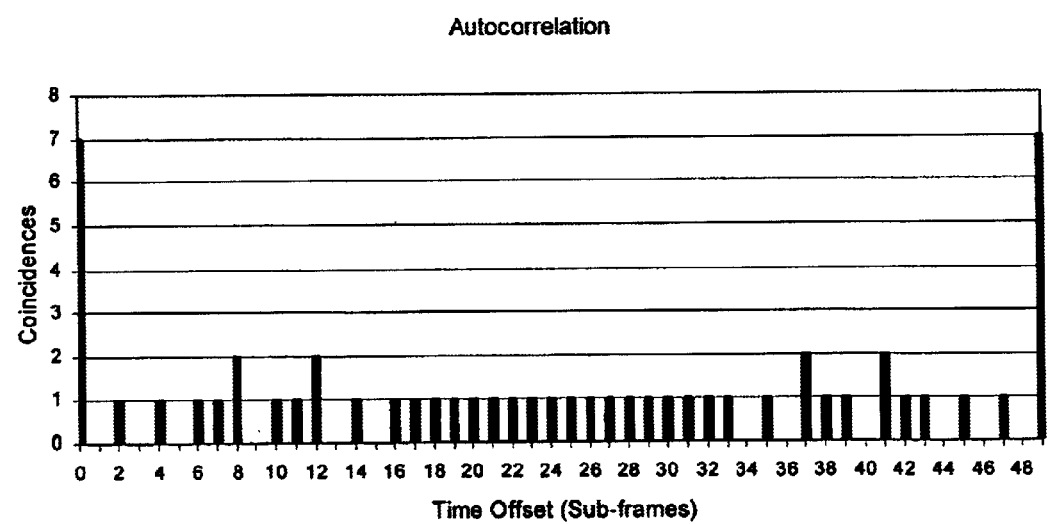
FIG. 11b is an example embodiment of a plot illustrating moving and re-plotting the data of FIG. 11a producing an exemplary 'thumbtack' plot.

FIG. 10 presents the autocorrelation properties of the $5^{th}$ code 902e where the time period layout 904 shown in FIG. 9 is correlated against other instances of the time layout 904 that are incrementally shifted in time by offsets equal to multiple of the width of a subframe 914. The figure illustrates how the wrapping effect takes place, where with each shift of the correlated time layout 904, the last subframe 914 is moved or 'wraps' to the front of the time layout 904. The striped bars 1002 are used to identify the coincidences that occur when the time period is correlated against the shifted instances of itself. Whenever a darkened subframe appears behind a striped bar 1002, a coincidence 1004 occurs. Thus it can be seen that when correlated against itself with no time offset, a total of seven coincidences 1004 occur, while for other offsets the number of coincidences 1004 varies from zero to two. FIG. 11*a* plots the number of coincidences 1004 versus the time offset (i.e., number of subframes 914 shifted). FIG. 11*b* plots the same data where the last half of the plot is moved to the front of the plot, which is allowable due to the wrapping effect described previously. This moving and re-plotting of the data produces what is commonly referred to as a 'thumbtack' plot.

Figure 12:
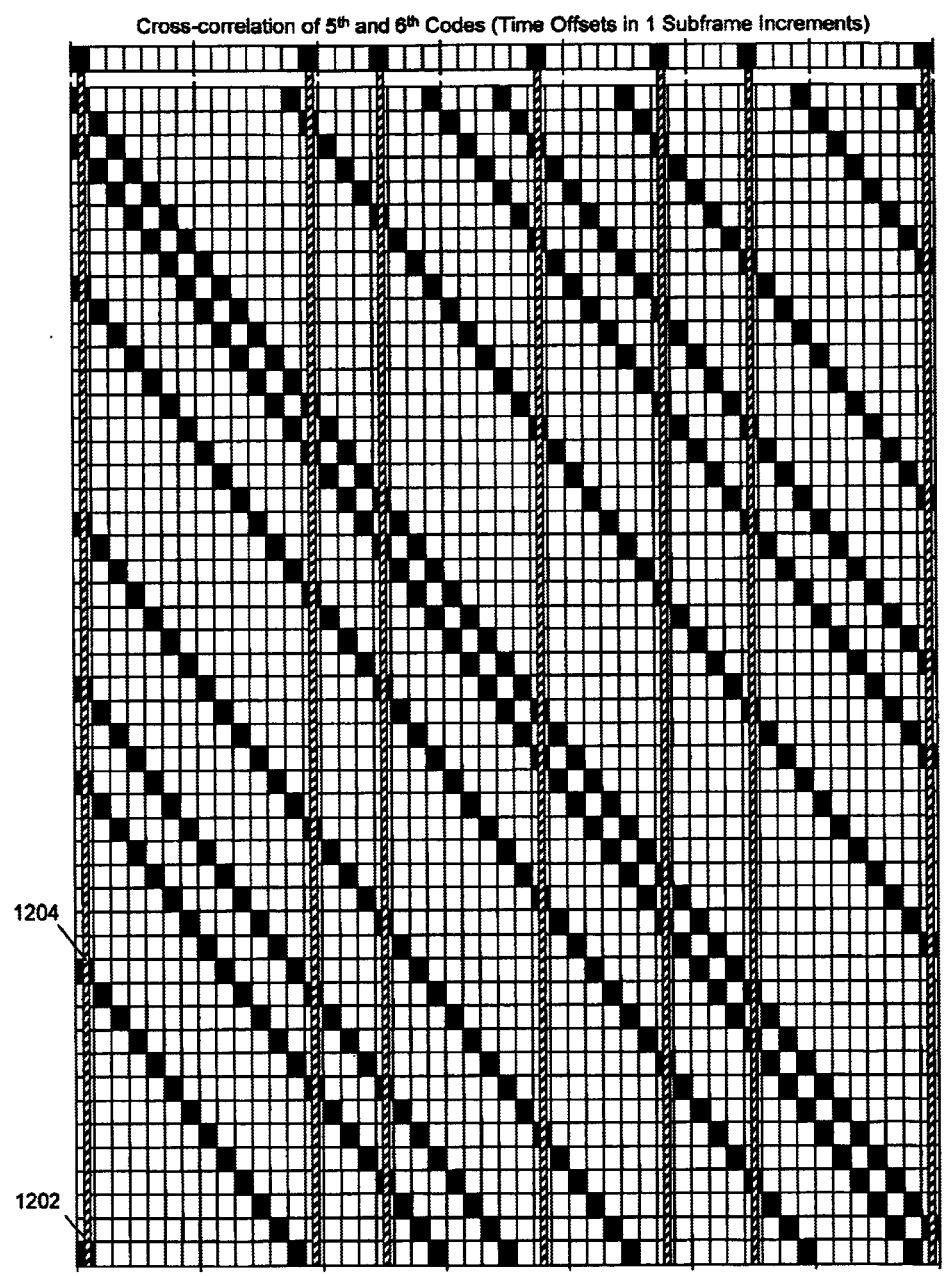
FIG. 12 illustrates cross-correlation properties of the $6^{th}$ channel code relative to the $5^{th}$ channel code of FIG. 9.
Figure 13:
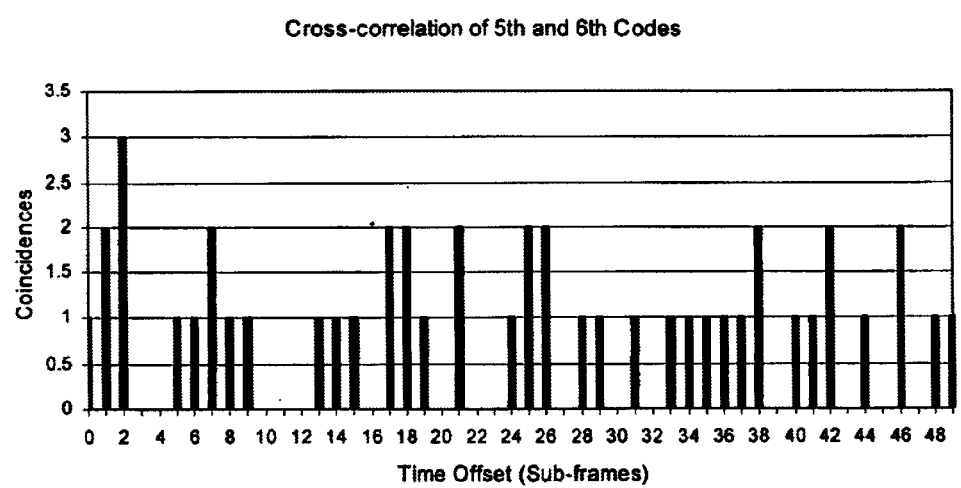
FIG. 13 is an example embodiment of a plot illustratively plotting coincidences of the cross-correlation of the $6^{th}$ and $5^{th}$ codes by time offset.

FIG. 12 presents the cross-correlation of the 5$^{th}$ code 902*e* and the 6$^{th}$ code 902*f*. In this figure a pulse train produced by mapped the 6$^{th}$ code 902*f* is shown correlated against instances of the 5$^{th}$ code 902*e* that are incrementally shifted in time by offsets equal to multiples of the width of a subframe 914. The striped bars 1202 are used to identify coincidences 1204 that occur when the time period 904 produced with the 6$^{th}$ code 902*f* is correlated against the shifted instances of a time layout 904 produced with the 5$^{th}$ code 902*e* where coincidences 1204 can be seen whenever a darkened subframe 914 appears behind a striped bar 1202. It should be noted that the instances of the 5$^{th}$ code 902*e* shown in FIG. 12 are the same as those shown in FIG. 10. The cross-correlation of these two codes 902*e*, 902*f* is depicted in FIG. 13, which shows the maximum number of coincidences 1204 that occurs is three.

Figure 14:
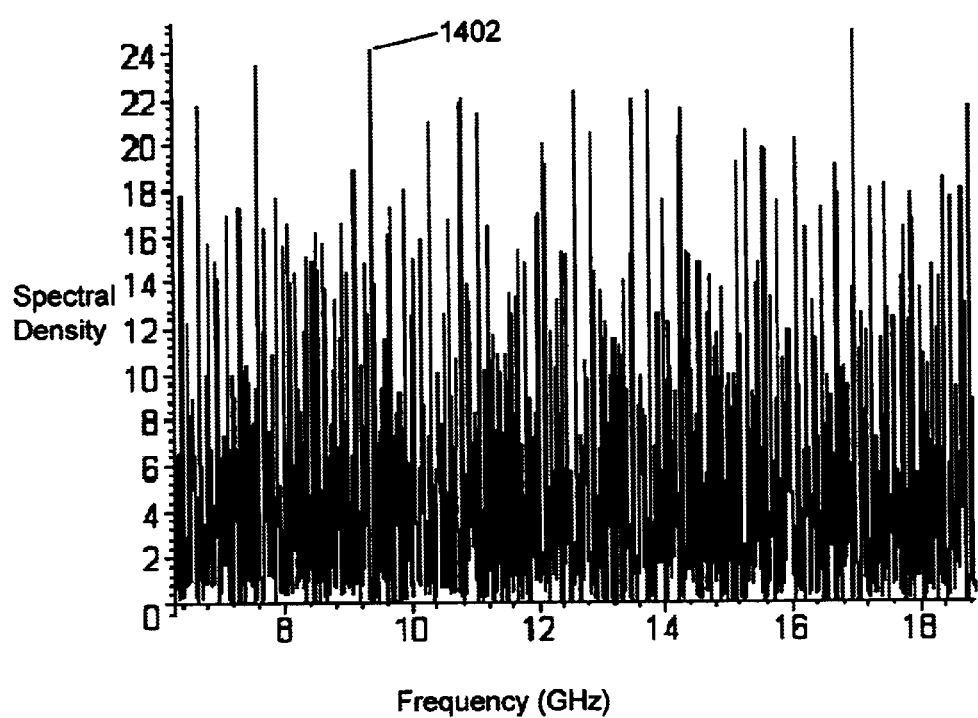
FIG. 14 illustrates a plot of the energy spectrum of a quadratic congruential code.

FIG. 14 depicts the energy spectrum, or spectral response, of a pulse train generated using a QC code like those presented in FIG. 9. In the figure, spectral density 1402 is plotted versus frequency.

For a given TM-UWB application, the maximum and/or average spectral density within some frequency bandwidth of interest may be required to be within some limit. Similarly, other characteristics of a pulse train, e.g., its correlation properties, may also need to meet certain requirements. Methods for establishing and enforcing acceptance criteria to ensure specific pulse train requirements are met are described in a co-owned patent application entitled "A METHOD AND APPARATUS FOR SPECIFYING PULSE CHARACTERISTICS USING A CODE THAT SATISFIES PREDEFINED CRITERIA", U.S. patent application Ser. No. 09/638,152 which is a Continuation-In-Part application for pending U.S. patent application Ser. No. 09/592,288, which is hereby incorporated by reference.

VI. Calculating a Spectral Response Curve

Figure 15:
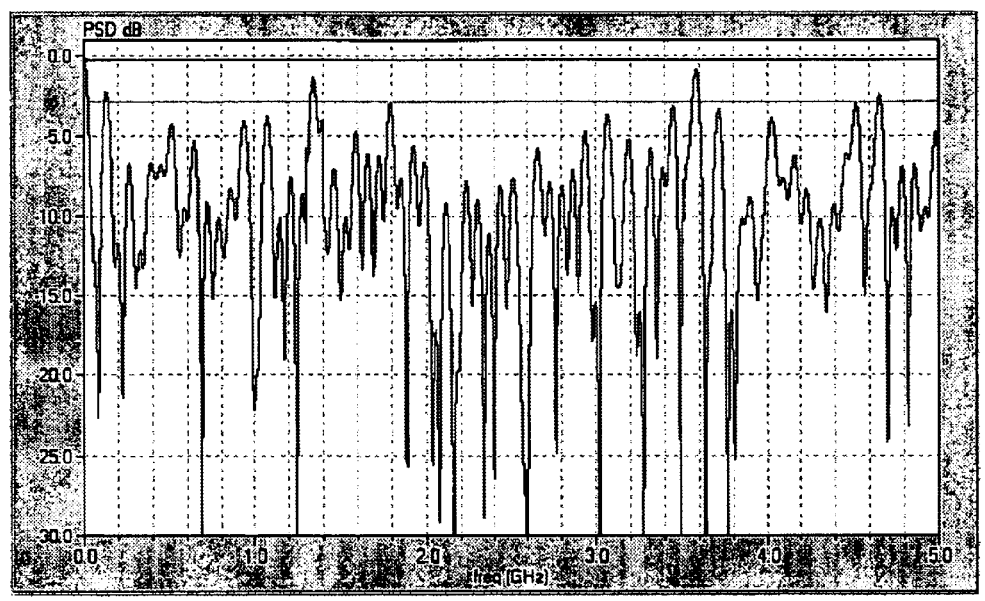
FIG. 15 depicts a typical spectral response produced in accordance with the present invention.

After the characteristics of the initial pulse train have been established, the PTSO calculates the spectral response of the pulse train. A typical spectral response, or spectrum, is provided in FIG. 15. The PTSO calculates the spectral response over one or more bandwidths of interest by summing the phasors of the pulses at each frequency using the equation:

$$A(\omega) = \left| \sum_{i=1}^{n} \frac{e^{j\omega t}}{n} \right|$$

where $A(\omega)$=amplitude of the spectral response at frequency, $\omega$ $\omega$=frequency being analyzed ($2\pi f$)

t=absolute time of each pulse n=total number of pulses in the pulse train, or using the equation:

$$A(\omega) = \left| \sum_{i=1}^{n} \frac{e^{j\Delta t}}{n} \right|$$

where $A(\omega)$=amplitude of the spectral response at frequency, $\omega$ $\omega$=frequency being analyzed ($2\pi f$)

$\Delta t$=relative time delay of each pulse from start of time period, $t_0$ n=total number of pulses in the pulse train.

The summed phasor amplitude values at each frequency, $A(\omega)$, produce a spectral response curve comprised of a series of peaks and valleys over a bandwidth. A bandwidth of interest, BW, may correspond to the inverse of the time period during which the pulse train occurs (i.e., BW=1/T, where T=$t_{max}$-$t_0$) or may be some other range of frequencies corresponding to bandwidth(s) of known interference, for example, bandwidth(s) used in compliance tests (e.g., by the Federal Communications Commission), or bandwidth(s) selected for any other reason. Although the above discussion relates to calculation of phasors, those skilled in the art will appreciate that any well-known method used to calculate spectral responses, such as a Fast Fourier Transform (FFT) technique, may also be used without departing from the scope of the invention.

VII. Selection Criteria

In order to control the optimization process, one or more selection criteria parameters are specified that define desirable pulse train spectral response characteristics. These selection criteria comprise a maximum peak amplitude threshold and/or characteristics of one or more notches in the spectral response such as notch location, width, and depth. The PTSO scans the spectral response curve and, depending on the specified selection criteria, determines the maximum peak amplitude value and/or values pertaining to characteristics of any notches that are present, and compares these values to established section criteria values.

Figure 16:
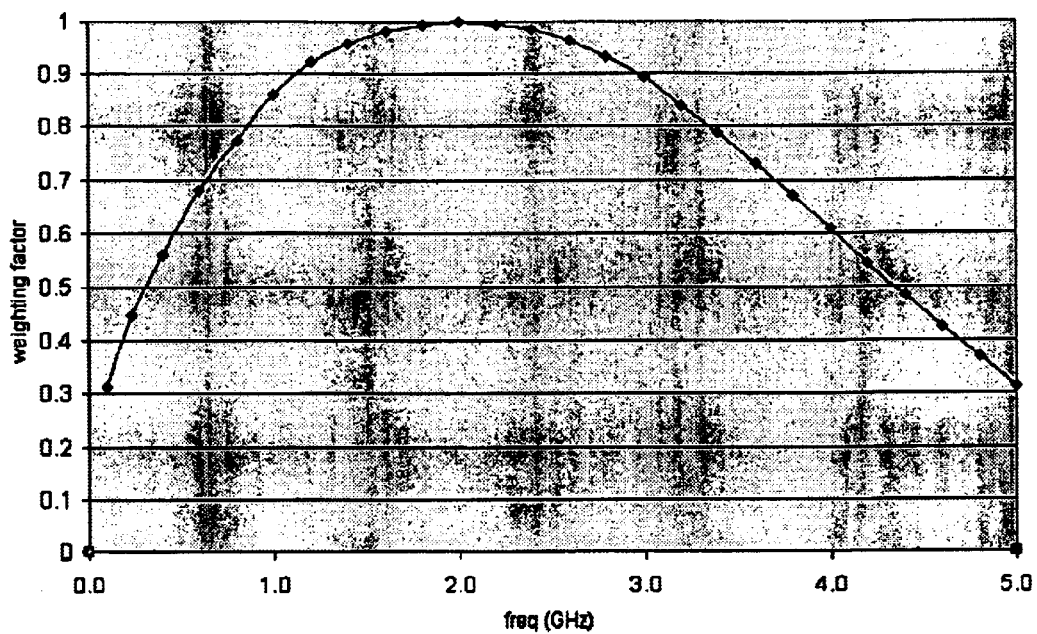
FIG. 16 depicts a typical weighting-factor curve as may be employed in accordance with the present invention.
Figure 17:
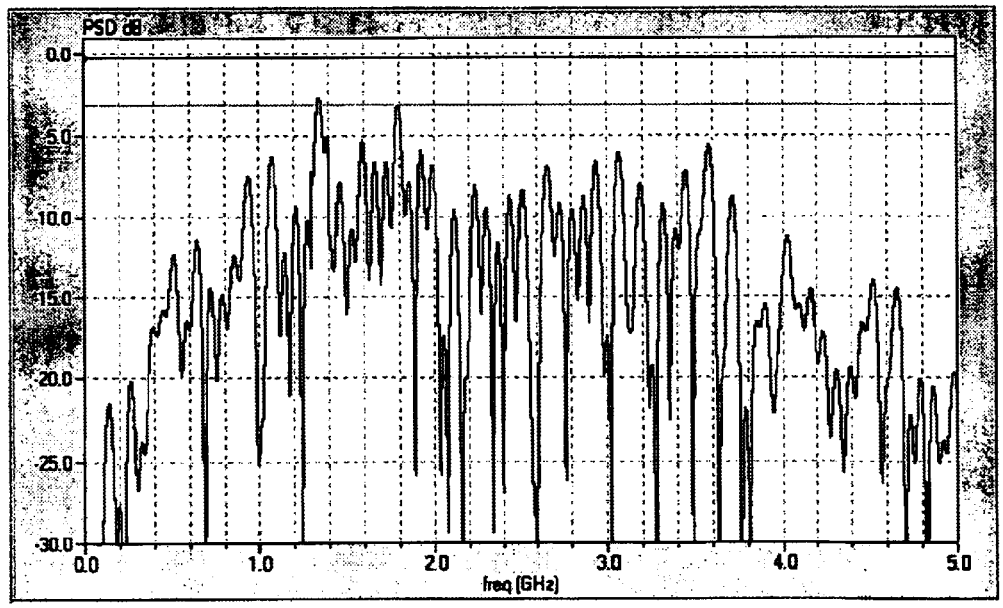
FIG. 17 depicts an exemplary weighted spectral response.

Selection criteria can optionally include weighting factors for each frequency within the bandwidth(s) of interest, which are multiplied by the summed phasor amplitude values to produce a weighted spectral response curve. The weighting factors bias the optimization process such that spectral response amplitudes at one or more frequencies within a bandwidth of interest are evaluated differently than amplitudes at other frequencies. When weighting factors are employed, the PTSO scans the weighted spectral response curve and, depending on the specified selection criteria, determines the maximum peak amplitude value and/or values pertaining to characteristics of any notches that are present, and compares these values to established selection criteria values. For example, the weighting factor curve shown in FIG. 16 can be used to cause a biased reduction in peak amplitudes about some frequency in the center of the bandwidth such that when it is applied to the spectral response curve provided in FIG. 15, a weighted spectral response curve like that shown in FIG. 17 is produced. The weighting factor values that are depicted in FIG. 16 increase from a minimum value of 0.314 at 100 MHz to a maximum value of 1.0 at 2 GHz before decreasing to a value of 0.314 at 5 GHz. With this weighting factor curve, the amplitude values about 2 GHz are almost three times more likely to be reduced by the PTSO than those amplitude values at the lowest and highest frequencies within the bandwidth of interest. Generally, the use of a weighting factor curve biases the optimization process such that the spectral response curve of the optimized pulse train resembles a curve that is approximately an inversion of the weighting factor curve. Thus, after employing the weighting factor curve given in FIG. 16, the spectral response curve of the optimized pulse train resembles a bell where the highest amplitudes are at the lowest and highest frequencies and the lowest amplitudes are about the center (i.e., 2 GHz).

Figure 18:
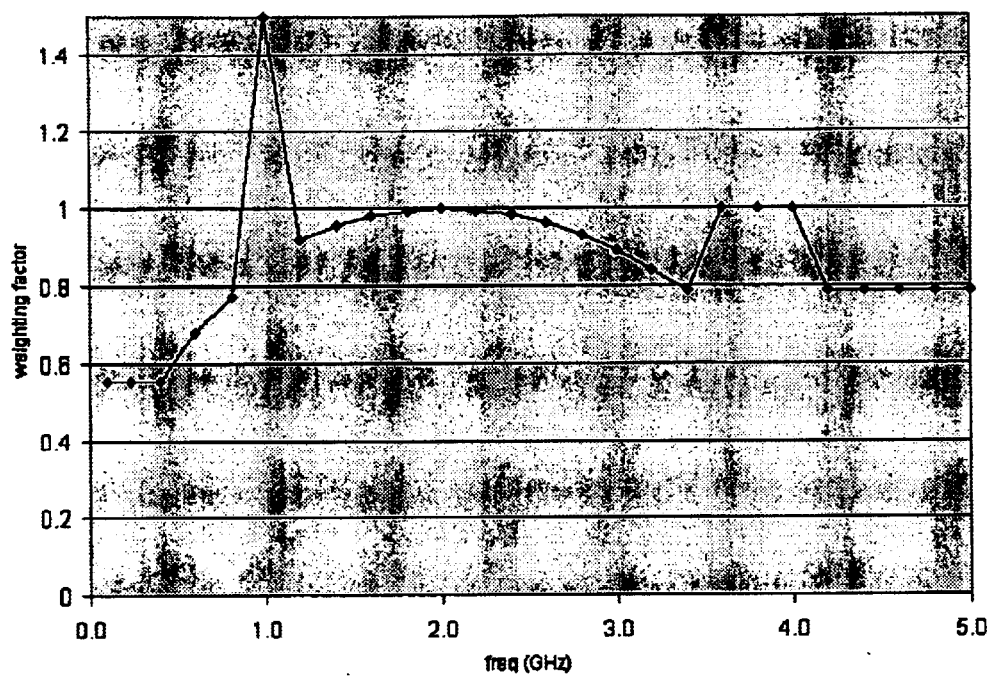
FIG. 18 depicts an exemplary weighting-factor curve.

Weighting factor values can also be used to bias the optimization process towards generating one or more notches in a spectral response. In FIG. 18, a weighting factor curve with steep spikes is shown which when employed by the PTSO causes notches to be produced in a spectral response. Generally, the relative amplitude and width of such spikes in the weighting factor curve affects the depth and width of the produced notches, respectively. Thus, the tall thin spike at 1 GHz produces a deeper and thinner notch, while the short wide spike about 3.8 GHz produces a shallower but much wider notch. Such notches in a spectral response are useful in pulse transmission systems to reduce interference by signals occurring at specific frequencies and conversely to reduce the likelihood of the pulse transmission system interfering with such signals.

Figure 19:
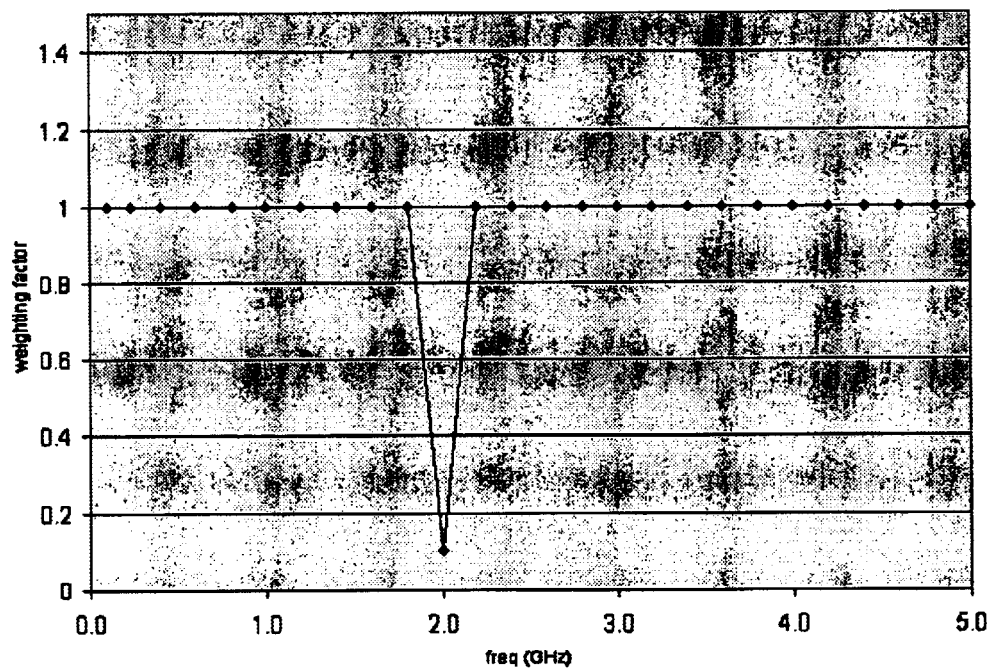
FIG. 19 depicts another exemplary weighting-factor curve.

In a similar manner, weighting factors can be used to bias the optimization process towards producing one or more spikes, or inverse notches, in a spectral response. As illustrated in FIG. 19, a notch can be placed in a weighting factor curve to cause an inverse notch to be produced in the spectral response. For this example, the PTSO can produce a pulse train with spectral density concentrated about 2 GHz. For example, such spikes in a spectral response can be used to increase available power usage by distributing system power emissions into bandwidths where higher amplitudes are allowed by the FCC (e.g., a fixed microwave band), to enable applications requiring concentrated spectral density, and to purposely interfere with, or jam, signals at specific frequencies. Generally, an unlimited number of weighting factor permutations can be employed to achieve spectral response curves with different desirable attributes.

VIII. Modifying a Pulse Train

The PTSO modifies a pulse train by shifting, adding, deleting, inverting, changing the amplitude, changing the width, and/or changing the type of one or more pulses, among other things. In one exemplary embodiment of the invention, whenever the PTSO attempts to change a pulse characteristic value, the new pulse characteristic value is first checked to determine whether it resides in a non-allowable region. Under this arrangement, whenever a characteristic value is found to be non-allowable, the characteristic value is adjusted to the nearest allowable value or, if the PTSO is unable to adjust the pulse characteristic value to an appropriate allowable value, the modification is rejected.

The PTSO can add pulses to and delete pulses from components, subcomponents, or smaller components. The PTSO may be configured to add and delete pulses in tandem such that the total number of pulses in the pulse train remains the same after the completion of the add/delete operation. An add/delete operation may also be governed by an established rule that requires that the correlation properties of the initial code be maintained, in which case a pulse may only be added to a component that contains at least one pulse, and a pulse may only be deleted from a component that contains at least two pulses. If such a rule is not in effect, pulses may be added to and deleted from any component, subcomponent, or smaller component. Typically, such a rule is appropriate when a designed code is used to establish the initial pulse train.

The PTSO can systematically optimize a pulse train using a multitude of single-sample and multiple-sample 'modify and compare' approaches. Individual pulses in the pulse train can be modified in sequential order, random order, or in another order defined by some ordering rule (e.g., reverse order, round-robin order, alternating order, etc.). Alternatively, combinations of pulses can be modified using some predefined order. A given modification sample may involve shifting one or more pulses, inverting one or more pulses, changing the amplitude of one or more pulses, changing the width of one or more pulses, changing the type of one or more pulses, or one or more add/delete operations. A modification sample may also involve a combination of shifting, inverting, changing the amplitude, changing the width, and/or changing the type of one or more pulses and/or multiple add/delete operations.

Figure 20A:
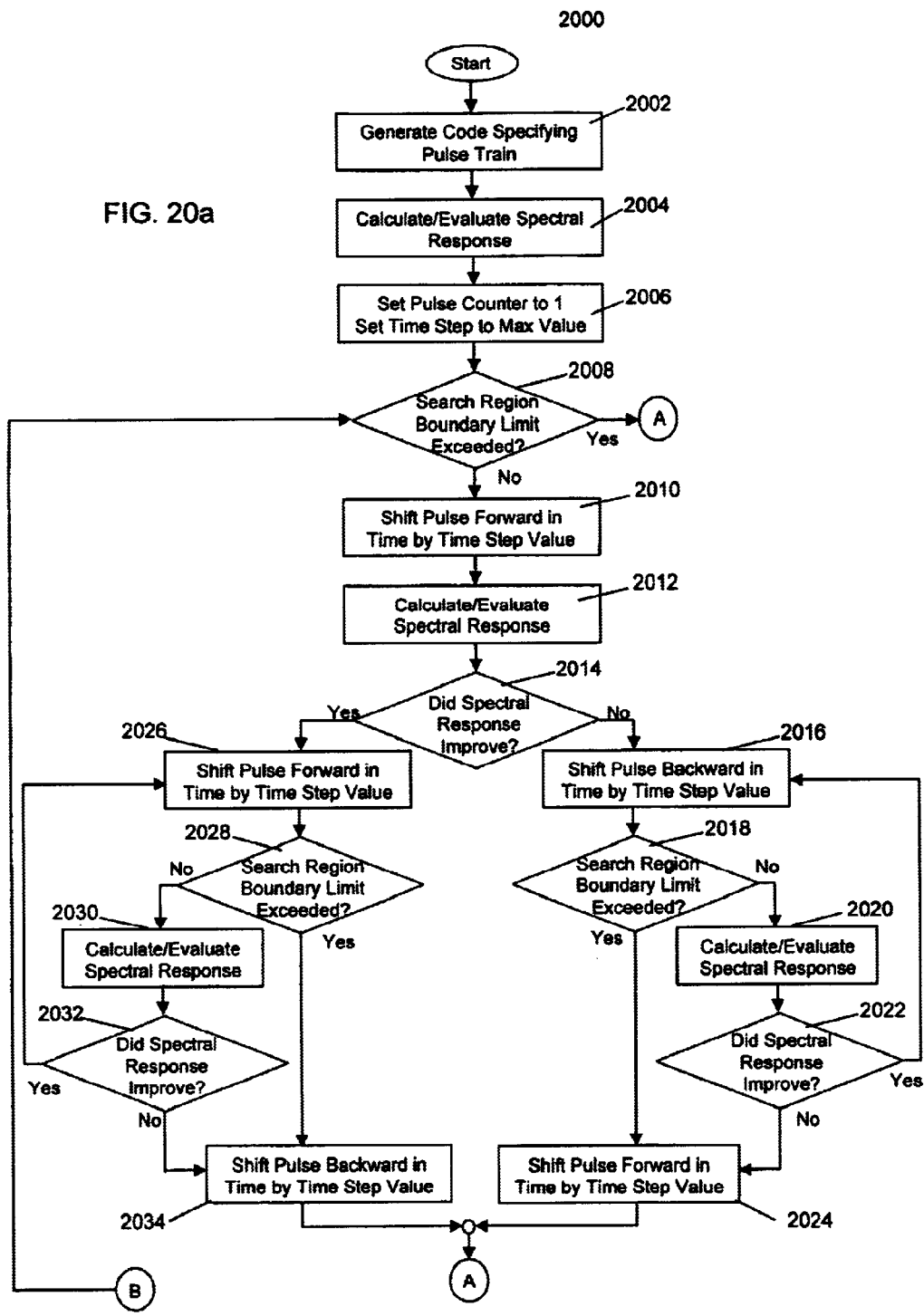
FIGS. 20a and 20b are combined to present a flowchart of an exemplary systematic pulse shifting process including single-pass and multiple-pass variations.
Figure 20B:
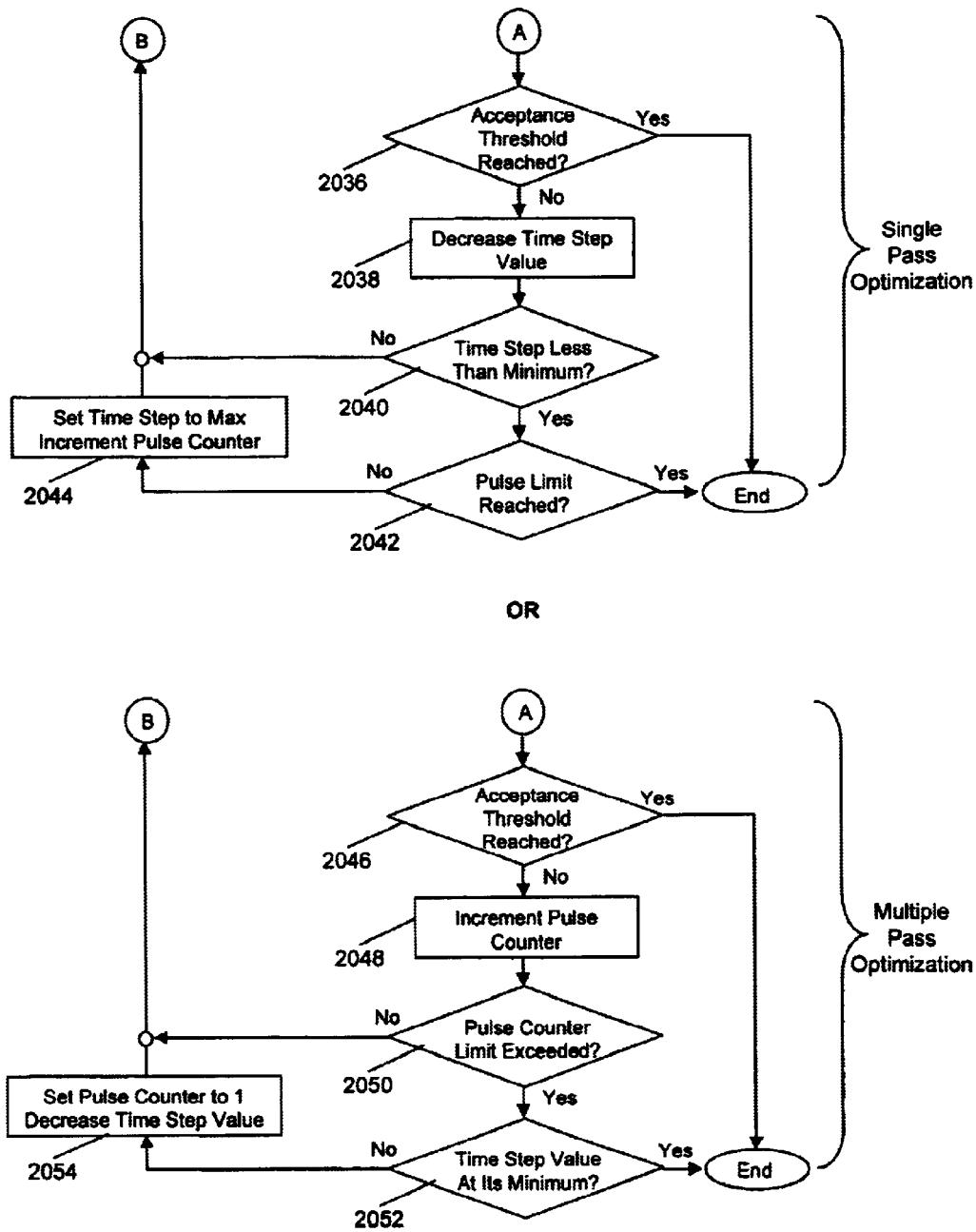

One embodiment of a single-sample approach, depicted in FIGS. 20a and 20b, involves shifting a pulse forward or backward in time by an established time step value in a systematic 'getting warmer—getting colder' manner. With this approach the direction of the time shift and the magnitude of the time step is changed based on the improvement or degradation of the calculated spectral response or weighted spectral response relative to selection criteria as required to locate the optimal position of the pulse within the time period component in which it resides. Alternatively, a pulse can be randomly shifted to different positions within a time period component or shifted in a manner defined by a variety of common numerical optimization search methods such as a Newton-Raphson method, steepest descent method, secant method, conjugate gradients method, first derivative test method, or second derivative test method. Generally, one skilled in the art will recognize that a multitude of different numerical methods commonly used for finding roots or solving minimization/maximization problems may be applied within the scope of the present invention.

As with an optimal pulse position in time, an optimal pulse amplitude or pulse width can similarly be determined by systematically increasing or decreasing the amplitude/width of a pulse by an amplitude/width step value and controlling the direction of the amplitude/width adjustment and magnitude of the amplitude/width step value. As with pulse position, pulse amplitude and pulse width can also be varied randomly or in a manner consistent with other common optimization search methods.

FIGS. 20a and 20b provide a flow diagram 2000 for a Systematic Single-Sample Optimization algorithm. FIG. 20b shows that certain steps of the algorithm can be reordered to produce a single-pass optimization mode or a multiple-pass optimization mode. In the single-pass optimization mode the time step size is varied over its full range for each pulse before moving to the next pulse. A pulse is selected for modification, the time step is set to its maximum value, and the single-sample modify and compare method is used with smaller and smaller time step sizes until the optimal pulse position is determined. Then, the next pulse to modify is selected, the time step size is reset to its maximum value, and the search method is applied to that pulse with smaller and smaller time step sizes until achieving an optimal pulse position. The process continues until all other pulse positions have been optimized. In the multiple-pass optimization mode, the time step size is maintained until all pulses have been optimized. The time step is reduced and each pulse position is optimized at the new time step size, and so on until the process is repeated for all time step sizes. The single-pass and multiple-pass optimization modes can also be used to optimize pulse amplitude or pulse width where the amplitude/width step magnitude is varied over its full range for each pulse before moving to the next pulse, or all pulse amplitudes/widths are optimized at each amplitude/width step size. A multitude of permutations of the single- and multiple-pass optimization methods can be employed using different combinations of pulse shifting, inverting, amplitude changes, width changes, and addition/deletion. Single-pass and multiple-pass optimizations can also be repeated, and various combinations of single-pass and multiple-pass optimizations can be performed, and these combinations can be repeated.

The single-pass optimization mode of the systematic single-sample algorithm consists of the following steps:

Step 1 (2002) Generate an initial code specifying a pulse train.

Step 2 (2004) Calculate the spectral response of the pulse than specified by the initial code and evaluate the spectral response against a selection criteria parameter.

Step 3 (2006) Set pulse counter to 1 and time step to a maximum value.

Step 4 (2008) If the search region boundary limit was exceeded, go to Step 18 (2036). Else proceed to Step 5.

Step 5 (2010) Shift pulse forward in time by the time step.

Step 6 (2012) Calculate the spectral response of the modified pulse train and evaluate the spectral response against a selection criteria parameter.

Step 7 (2014) If the spectral response improved, go to Step 13 (2026). Else, go to Step 8 (2016).

Step 8 (2016) Shift pulse backward in time by the time step.

Step 9 (2018) If the search region boundary limit was exceeded, go to Step 12 (2020). Else proceed to Step 10.

Step 10 (2020) Calculate the spectral response of the modified pulse train and evaluate the spectral response against a selection criteria parameter.

Step 11 (2022) If the spectral response improved, go to Step 8 (2016). Else, proceed to Step 12 (2024).

Step 12 (2024) Shift pulse forward in time by the time step. Go to Step 18 (2036).

Step 13 (2026) Shift pulse forward in time by the time step.

Step 14 (2028) If the search region boundary limit was exceeded, go to Step 17 (2034). Else proceed to Step 15.

Step 15 (2030) Calculate the spectral response of the modified pulse train and evaluate the spectral response against a selection criteria parameter.

Step 16 (2032) If the spectral response improved, go to Step 13 (2026). Else, proceed to Step 17 (2034).

Step 17 (2034) Shift pulse backward in time by the time step. Proceed to Step 18 (2036).

Step 18 (2036) If a selection criteria threshold has not been satisfied, proceed to Step 19 (2038). Else, end processing.

Step 19 (2038) Decrease the time step value.

Step 20 (2040) If the time step value is less than a minimum value, proceed to Step 21. Else, go to Step 4 (2008).

Step 21 (2042) If a pulse limit has not been reached, proceed to Step 22 (2044). Else, end processing.

Step 22 (2044) Set the time step to the maximum value and increment the pulse counter. Go to Step 4 (2008).

The multiple-pass optimization mode of the systematic single-sample algorithm consists of the following steps:

Step 1 (2002) Generate an initial code specifying a pulse train.

Step 2 (2004) Calculate the spectral response of the pulse train specified by the initial code and evaluate the spectral response against a selection criteria parameter.

Step 3 (2006) Set pulse counter to 1 and time step to a maximum value.

Step 4 (2008) If the search region boundary limit was exceeded, go to Step 18 (2036). Else proceed to Step 5.

Step 5 (2010) Shift pulse forward in time by the time step.

Step 6 (2012) Calculate the spectral response of the modified pulse train and evaluate the spectral response against a selection criteria parameter.

Step 7 (2014) If the spectral response improved, go to Step 13 (2026). Else, go to Step 8 (2016).

Step 8 (2016) Shift pulse backward in time by the time step.

Step 9 (2018) If the search region boundary limit was exceeded, go to Step 12 (2020). Else proceed to Step 10.

Step 10 (2020) Calculate the spectral response of the modified pulse train and evaluate the spectral response against a selection criteria parameter.

Step 11 (2022) If the spectral response improved, go to Step 8 (2016). Else, proceed to Step 12 (2024).

Step 12 (2024) Shift pulse forward in time by the time step. Go to Step 18 (2046).

Step 13 (2026) Shift pulse forward in time by the time step.

Step 14 (2028) If the search region boundary limit was exceeded, go to Step 17 (2034). Else proceed to Step 15.

Step 15 (2030) Calculate the spectral response of the modified pulse train and evaluate the spectral response against a selection criteria parameter.

Step 16 (2032) If the spectral response improved, go to Step 13 (2026). Else, proceed to Step 17 (2034).

Step 17 (2034) Shift pulse backward in time by the time step. Proceed to Step 18 (2036).

Step 18 (2046) If a selection criteria threshold has not been satisfied, proceed to Step 19 (2048). Else, end processing.

Step 19 (2048) Increment the pulse counter.

Step 20 (2050) If a pulse counter limit has been exceeded, proceed to Step 21. Else, go to Step 4 (2008).

Step 21 (2052) If the time step value is less than a minimum value, proceed to Step 22 (2054). Else, end processing.

Step 22 (2054) Set the pulse counter to 1 and decrease the time step size. Go to Step 4 (2008).

Figure 21:
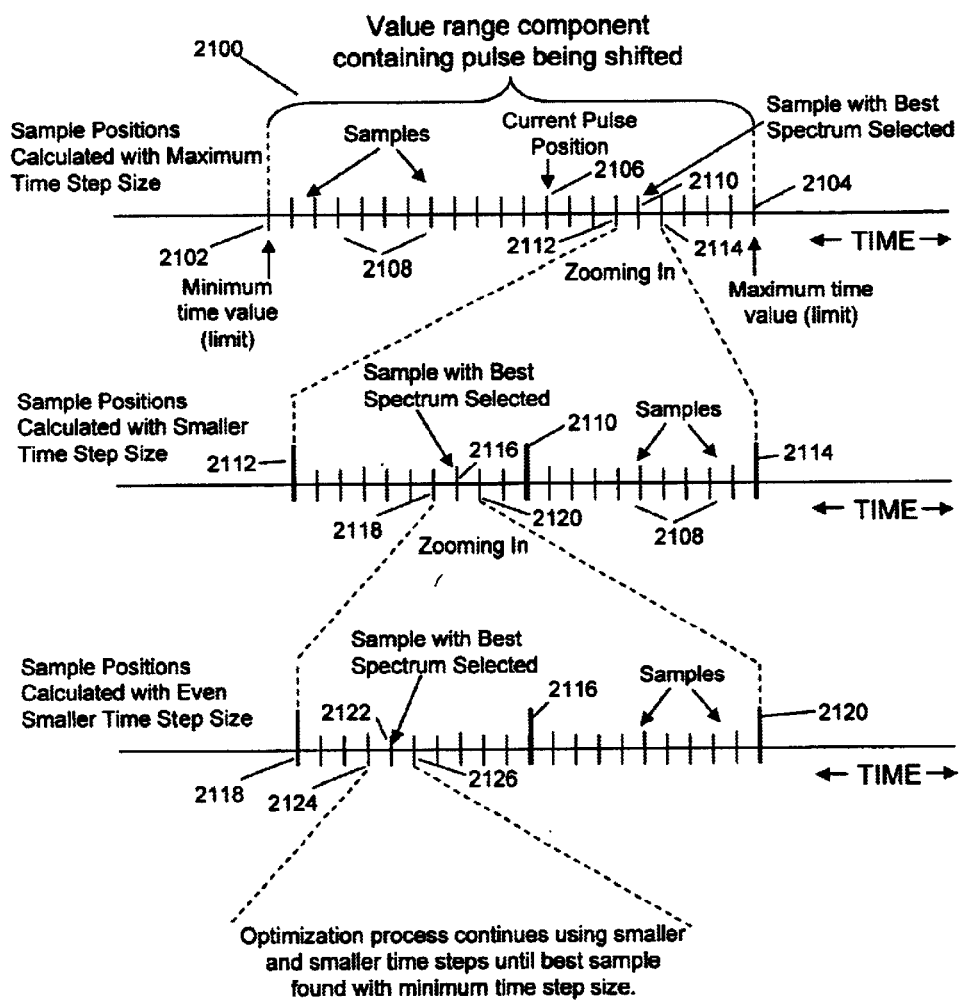
FIG. 21 illustrates an exemplary systematic multiple-sample optimization process.

The systematic, random, and other common numerical optimization search methods can be applied using multiple samples per selection decision. As shown in FIG. 21, a grid of time positions within a time component containing a pulse can be calculated using the maximum time step size. The spectral response or weighted spectral response can be calculated for the pulse shifted to each of these positions, where each position represents a different pulse train sample. After the spectral responses of all samples have been calculated, the time position representing the sample with the best spectral response can then be selected. The time step can be reduced in size and another grid of time positions can be calculated about the selected best position, which is bounded by the previous and following positions at the previous time step size. The spectral response or weighted spectral response can be calculated at each of these positions and the new best position selected, and the process repeated, using grids made up of smaller and smaller time steps, until the best position is located.

Referring to FIG. 21, a value range component 2100 within a time layout has a minimum time value 2102 and a maximum time value 2104 and contains a pulse having a current pulse position 2106 as specified by an initial code (or codes) or as previously modified by the PTSO. A grid is calculated using the maximum time step size producing a sequence of sample pulse time positions 2108. The spectral responses of each sample 2108 are calculated and the sample 2110 with the most desirable energy spectrum relative to selection criteria is selected. The sample time positions 2108 bounding the best sample 2110 become the search boundaries 2112, 2114. The time step is reduced to the next smaller size and a new grid of time position samples 2108 is calculated between the search boundaries 2112, 2114 about the time position 2110 previously determined to have the best spectrum. The spectral responses of each sample 2108 are calculated and the sample 2116 having the most desirable energy spectrum relative to selection criteria is selected. The sample time positions 2108 bounding the best sample 2116 become the search boundaries 2118, 2120. The time step is reduced to the next smaller size and a new grid of the position samples 2108 is calculated between the search boundaries 2118, 2120 about the time position 2116 previously determined to have the best spectrum. The spectral responses of each sample 2108 are calculated and the sample 2122 having the most desirable energy spectrum relative to selection criteria is selected. The sample time positions 2108 bounding the best sample 2122 become the search boundaries 2124, 2126, and the process continues until the most desirable sample 2108 is found with the minimum time step size.

The systematic, random or other common numerical optimization search methods and the multiple samples per selection decision approach can be employed to determine optimal pulse amplitude or pulse width, where the amplitude/width step size is varied and multiple amplitude/width values are sampled about a current best amplitude/width value at each amplitude/width step size. Similarly, the systematic, random or other common numerical optimization search methods and the multiple samples per selection decision approach can be used to optimally invert pulses in a pulse train, in which case single pulses or combinations of pulses can be inverted and the optimal inverted pulse combination selected. Additionally, the type of pulses can be varied and add/delete operations can be performed using the systematic, random, or other common numerical optimization search methods and multiple samples per selection decision. These search methods can also be used to determine optimal combinations of pulse shifting, inverting, amplitudes, widths, types, and/or addition/deletion.

VIV. Selecting the Current Best Pulse Train

The PTSO selects the best pulse train by comparing the spectral response characteristics of one or more modified pulse train samples to the current best pulse train and determining which spectral response characteristics best meet selection criteria. For the single-sample approach the characteristics of the modified pulse train are compared to those of the current best pulse train, and the pulse train which best meets selection criteria is selected. If determined to have better spectral response characteristics, the modified pulse train becomes the current best pulse train, which is modified during the next optimization iteration. Otherwise, the current best pulse train is modified again during the next optimization operation. For the multiple-sample approach, the spectral response characteristics of each of the modified pulse train samples are compared and the sample with the best characteristics is identified as the best sample. Its characteristics are then compared to those of the current best pulse train. If determined to have better spectral response characteristics, the best sample becomes the current best pulse train and is modified during the next optimization operation. Otherwise, the current best pulse train is modified again during the next optimization operation.

X. Optimized Pulse Train Specification

Once the PTSO has optimized a pulse train to meet established acceptance criteria or to the greatest extent possible within an allowed number of optimization iterations, it outputs an optimized pulse train specification comprised of one or more codes. As appropriate, methods for specifying multiple pulse characteristics with each code element may be employed as described in a co-owned patent application entitled "METHOD FOR SPECIFYING PULSE CHARACTERISTICS USING CODES U.S. patent application Ser. No. Ser. 09/638,153 which is a Continuation-In-Part application for pending U.S. patent application Ser. No. 09/592,290, which was previously cited.

XI. Exemplary Transceiver Implementation

A. Transmitter

Figure 22:
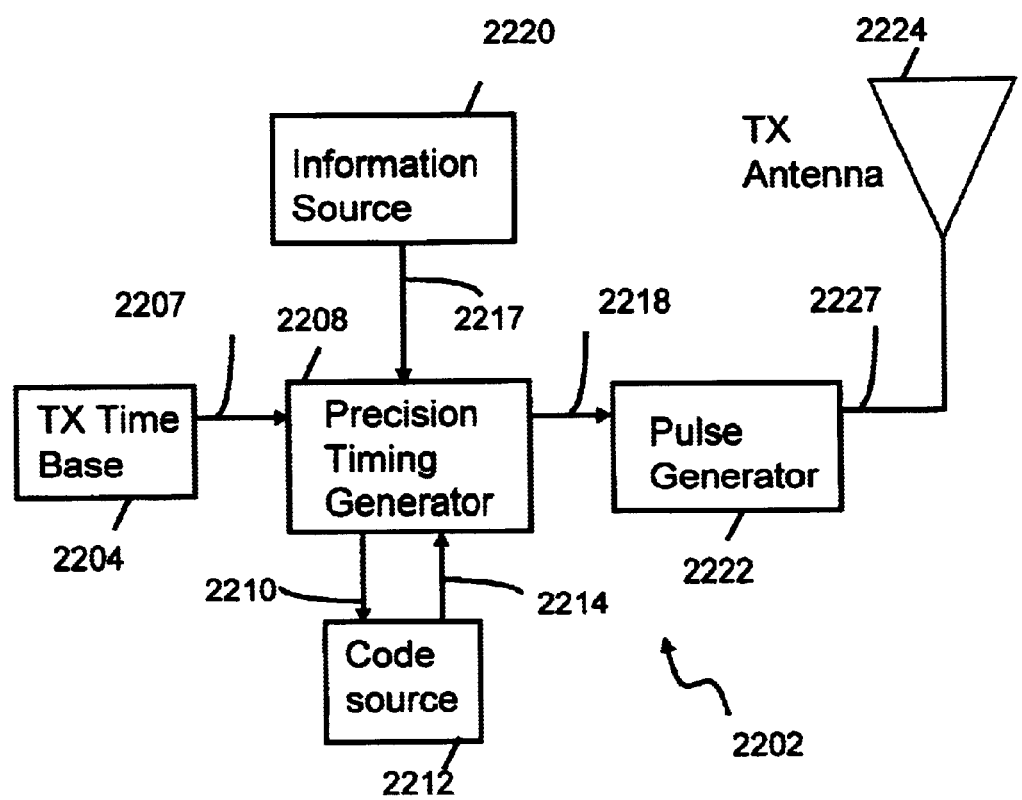
FIG. 22 is a block diagram of an impulse transmitter that advantageously uses the present invention.

Referring to FIG. 22, an exemplary embodiment of an impulse radio transmitter 2202 of an impulse radio communication system having one subcarrier channel that advantageously employs the above-described invention is shown.

The transmitter 2202 comprises a time base 2204 that generates a periodic timing signal 2207. The time base 2204 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 2207 is supplied to a precision timing generator 2208.

The precision timing generator 2208 supplies synchronizing signals 2210 to the code source 2212 and utilizes the code source output 2214 together with an internally generated subcarrier signal (which is optional) and an information signal 2217 to generate a modulated, coded timing signal 2218.

The code source 2212 comprises a storage device such as a random access memory (RAM), read only memory (ROM), or the like, for storing suitable time-hopping codes and for outputting the time-hopping codes as a code signal 2214. Alternatively, maximum length shift registers or other computational means can be used to generate the time-hopping codes.

An information source 2220 supplies the information signal 2217 to the precision timing generator 2208. The information signal 2217 can be any type of intelligence, including digital bits representing voice, data, imagery, or the like, analog signals, or complex signals.

Figure 23:
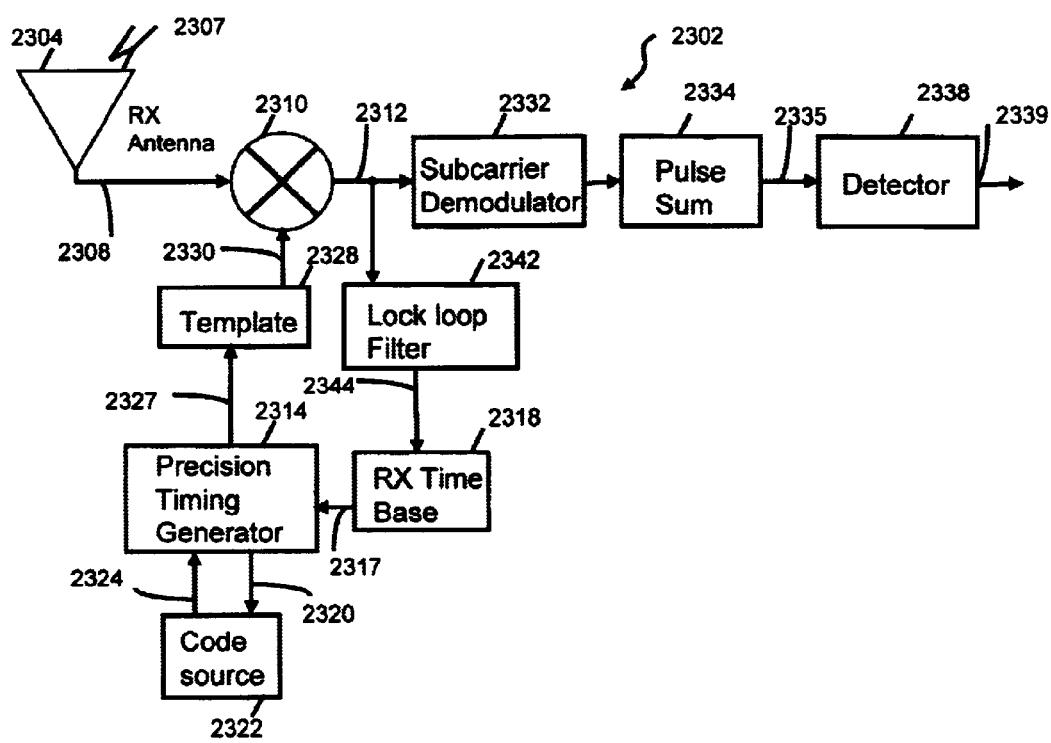
FIG. 23 is a block diagram of an impulse transmitter that advantageously uses the present invention.

A pulse generator 2222 uses the modulated, coded timing signal 2218 as a trigger to generate output pulses. The output pulses are sent to a transmit antenna 2224 via a transmission line 2227 coupled thereto. The output pulses are converted into propagating electromagnetic pulses by the transmit antenna 2224. In the present embodiment, the electromagnetic pulses are called the emitted signal, and propagate to an impulse radio receiver 2302, such as shown in FIG. 23, through a propagation medium, such as air, in a radio frequency embodiment. In a preferred embodiment, the emitted signal is wide-band or ultrawide-band, approaching a monocycle pulse.

However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

B. Receiver

FIG. 23 shows an exemplary embodiment of an impulse radio receiver 2302 (hereinafter called the receiver) for the impulse radio communication that may be used in connection with the present invention. More specifically, the system illustrated in FIG. 23 is for reception of digital data wherein one or more pulses are transmitted for each data bit.

The receiver 2302 comprises a receive antenna 2304 for receiving a propagated impulse radio signal 2307. A received signal 2308 from the receive antenna 2304 is coupled to a cross correlator or sampler 2310 to produce a baseband output 2312. The cross correlator or sampler 2310 includes multiply and integrate functions together with any necessary filters to optimize signal to noise ratio.

The receiver 2302 also includes a precision timing generator 2314, which receives a periodic timing signal 2317 from a receiver time base 2318. This time base 2318 is adjustable and controllable in time, frequency, or phase, as required by the lock loop in order to lock on the received signal 2308. The precision timing generator 2314 provides synchronizing signals 2320 to the code source 2322 and receives a code control signal 2324 from the code source 2322. The precision timing generator 2314 utilizes the periodic timing signal 2317 and code control signal 2324 to produce a coded timing signal 2327. The template generator 2328 is triggered by this coded timing signal 2327 and produces a train of template signal pulses 2330 ideally having waveforms substantially equivalent to each pulse of the received signal 2308. The code for receiving a given signal is the same code utilized by the originating transmitter 2302 to generate the propagated signal 2307. Thus, the timing of the template pulse train 2330 matches the timing of the received signal pulse train 2308, allowing the received signal 2308 to be synchronously sampled in the correlator 2310. The correlator 2310 ideally comprises a multiplier followed by a short-term integrator to sum the multiplier product over the pulse interval.

Further examples and details of correlation and sampling processes can be found in commonly owned U.S. Pat. Nos. 4,641,317, 4,743,906, 4,813,057, and 4,979,186, which are incorporated herein by reference, and commonly owned and co-pending application Ser. No. 09/356,384, filed Jul. 16, 1999, titled: "BASEBAND SIGNAL CONVERTER DEVICE FOR A WIDEBAND IMPULSE RADIO RECEIVER," which is incorporated herein by reference.

The output of the correlator 2310, also called a baseband signal 2312, is coupled to a subcarrier demodulator 2332, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 2332 is then filtered or integrated in a pulse summation stage 2334. The pulse summation stage product an output representative of the sum of a number of pulse signals comprising a single data bit. The output of the pulse summation stage 2334 is then compared with a nominal zero (or reference) signal output in a detector stage 2338 to determine an output signal 2339 representing an estimate of the original information signal 2217.

The baseband signal 2312 is also input to a lowpass filter 2342 (also referred to as lock loop filter 2342). A control loop comprising the lowpass filter 2342, time base 2318, precision timing generator 2314, template generator 2328, and correlator 2310 is used to generate a filtered error signal 2344. The filtered error signal 2344 provides adjustments to the adjustable time base 1618 to time position the periodic timing signal 2327 in relation to the position of the received signal 2308.

In a transceiver embodiment, substantial economy can be achieved by sharing part or all of several of the functions of the transmitter 2202 and receiver 2302. Some of these include the time base 2318, precision timing generator 2314, code source 2322, antenna 2304, and the like.

Figure 24:
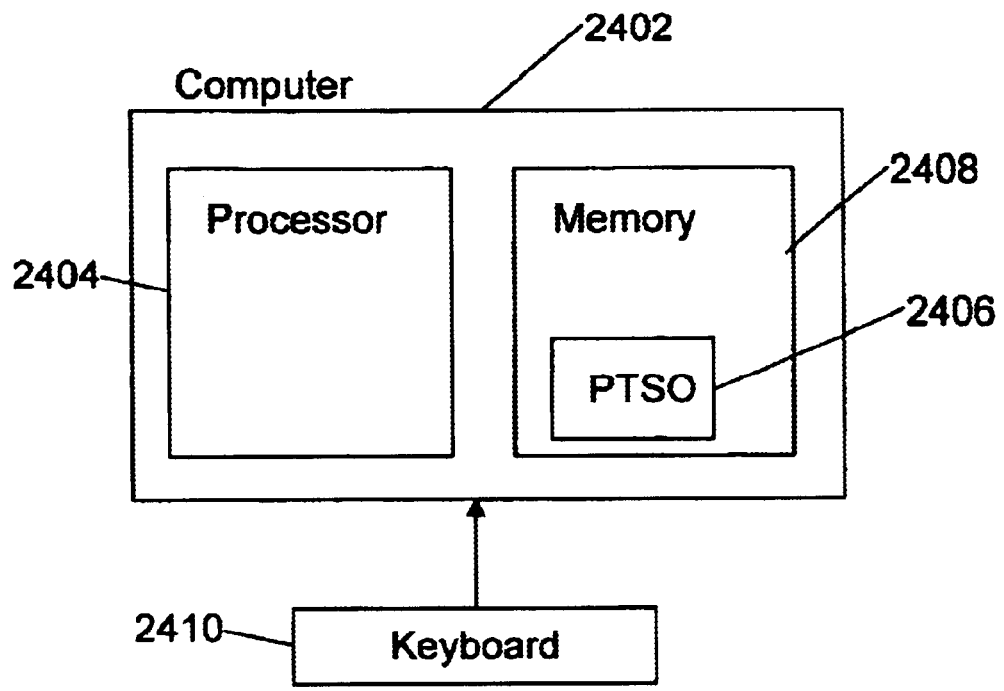
FIG. 24 is a block diagram of a computer that generates codes in accordance with the present invention.

FIG. 24 is a block diagram of a computer 2402 containing a processor 2404 executing a program 2406 residing in memory 2408 that generates codes in accordance with the present invention. The computer receives inputs specifying desirable spectral response characteristics of a pulse train, for example via a keyboard 2410. The processor generates an initial code that specifies an initial pulse train, calculates the spectral response of the initial pulse train, modifies at least one characteristic of at least one pulse in accordance with user-specified control parameters, calculates the spectral response of the modified pulse train, and selects a pulse train that meets a user-specified spectral response selection criteria. The processor then generates at least one code that specifies the optimized pulse train.

What is claimed is:

1. A method for generating a code, comprising the steps of:
   a. specifying at least one pulse;
   b. calculating the spectral response of the at least one pulse;
   c. modifying at least one pulse characteristic of the at least one pulse;
   d. based on at least one modified pulse characteristic, selecting at least one pulse that meets a spectral response selection criteria; and
   e. generating at least one code that specifies the at least one selected pulse.

2. The method of claim 1, wherein a pulse characteristic is at least one of:
   a temporal pulse characteristic; and
   a non-temporal pulse characteristic.

3. The method of claim 2, wherein said temporal pulse characteristic is a position in time.

4. The method of claim 2, wherein said non-temporal pulse characteristic is a pulse amplitude.

5. The method of claim 2, wherein said non-temporal pulse characteristic is a pulse width.

6. The method of claim 2, wherein said non-temporal pulse characteristic is a pulse polarity.

7. The method according to claim 6, wherein said pulse polarity indicates whether said pulse is inverted.

8. The method of claim 2, wherein said non-temporal pulse characteristic is a pulse type.

9. The method according to claim 8, wherein said pulse type indicates whether said pulse is any one of:
   a square wave pulse;
   a sawtooth pulse;
   a Haar wavelet pulse;
   a Gaussian monopulse;
   a doublet pulse;
   a triplet pulse; and
   a set of wavelets.

10. The method of claim 1, wherein the at least one pulse is specified in accordance with an initial code.

11. The method of claim 10, wherein the initial code is generated using a numerical code generation technique.

12. The method of claim 11, wherein said numerical code generation technique comprises at least one of:
   a Welch-Costas code generation technique;
   a Golomb-Costas code generation technique;
   a Quadratic Congruential code generation technique;
   a Linear Congruential code generation technique;
   a Hyperbolic Congruential code generation technique;
   a linear congruential pseudorandom number generator technique;

an address lagged-Fibonacci pseudorandom number generator technique;

a linear feedback shift register pseudorandom number generator technique;

a lagged-Fibonacci shift register pseudorandom number generator technique;

a chaotic code pseudorandom number generator technique; and an optimal Golomb ruler code pseudorandom number generator technique.

13. The method of claim 1, wherein the at least one pulse characteristic of the at least one pulse is modified in accordance with at least one pre-defined rule.

14. The method according to claim 13, wherein the at least one pre-defined rule corresponds to at least one characteristic value layout.

15. The method according to claim 14, wherein said at least one characteristic value layout specifies a range of pulse characteristic values.

16. The method according to claim 15, wherein said range of pulse characteristic values is subdivided into at least one of:

components;

sub-components of said components;

smaller components of said sub-components; and even smaller components of said smaller components.

17. The method according to claim 16, wherein each of said components is at least one of:

a same size, and a different size than an other of said components;

each of said sub-components is at least one of:

a same size, and a different size than an other of said sub-components;

each of said smaller components of said sub-components is at least one of:

a same size, and a different size than an other of said smaller components of said subcomponents; and each of said even smaller components of said smaller components is at least one of:

a same size, and a different size than an other of said even smaller components of said smaller components.

18. The method according to claim 14, wherein said at least one characteristic value layout specifies at least one discrete pulse characteristic value.

19. The method of claim 14, wherein said at least one characteristic value layout specifies a range of pulse characteristic values and at least one discrete pulse characteristic value.

20. The method of claim 14, wherein said at least one characteristic value layout includes at least one non-allowable region specifying at least one non-allowed pulse characteristic value.

21. The method of claim 1, wherein the step of modifying at least one pulse characteristic of the at least one pulse comprises sequentially modifying at least one pulse characteristic of a plurality of pulses.

22. The method of claim 1, wherein the step of modifying at least one pulse characteristic of the at least one pulse comprises randomly modifying at least one pulse characteristic of a plurality of pulses.

23. The method of claim 1, wherein the step of modifying at least one pulse characteristic of the at least one pulse comprises modifying at least one pulse characteristic of a plurality of pulses based on a predefined order.

24. The method of claim 1, wherein calculating the spectral response of the at least one pulse comprises calculating the Fast Fourier Transform of the at least one pulse.

25. The method of claim 1, wherein calculating the spectral response of the at least one pulse comprises summing phasors for the at least one pulse at specified frequencies of a bandwidth.

26. The method of claim 1, further comprising the step of weighting the spectral response in accordance with a weighting curve.

27. The method of claim 1, wherein the spectral response selection criteria corresponds to at least one spectral density value.

28. The method of claim 1, wherein the spectral response selection criteria corresponds to at least one notch characteristic.

29. The method of claim 28, wherein the at least one notch characteristic corresponds to at least one of a notch location and notch width.

30. The method of claim 1, wherein the step of modifying at least one characteristic of at least one pulse comprises at least one of:

shifting one or more pulses;

adding one or more pulses;

deleting one or more pulses;

inverting one or more pulses;

changing the amplitude of one or more pulses;

changing the width of one or more pulses; and changing the type of one or more pulses.

31. The method of claim 30, wherein pulse additions and deletions occur in tandem such that a number of a plurality of pulses is unchanged.

32. The method of claim 1, wherein the at least one pulse characteristic of the at least one pulse is modified in accordance with a pulse characteristic modification increment.

33. The method of claim 32, wherein the pulse characteristic modification increment is adjusted.

34. The method of claim 33, wherein the pulse characteristic modification increment is increased.

35. The method of claim 33, wherein the pulse characteristic modification increment is decreased.

36. The method of claim 1, wherein the at least one pulse characteristic of the at least one pulse is modified at random.

37. The method of claim 1, wherein the at least one pulse characteristic of the at least one pulse is modified using at least one of a:

Newton-Raphson method, steepest descent method, secant method, conjugate gradients method, first derivative test method, and second derivative test method.

38. An apparatus operable for carrying out the steps of the method of claim 1.

39. A computer-readable storage device storing a set of computer executable instructions for performing the method of claim 1.

* * * * *